United States Patent
He et al.

(10) Patent No.: US 9,973,751 B2
(45) Date of Patent: May 15, 2018

(54) SLICE BASE SKIP MODE SIGNALING FOR MULTIPLE LAYER VIDEO CODING

(71) Applicant: VID SCALE, INC., Wilmington, DE (US)

(72) Inventors: Yong He, San Diego, CA (US); Yan Ye, San Diego, CA (US); Yuwen He, San Diego, CA (US); Xiaoyu Xiu, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days. days.

(21) Appl. No.: 13/968,695

(22) Filed: Aug. 16, 2013

(65) Prior Publication Data

US 2014/0050264 A1 Feb. 20, 2014

Related U.S. Application Data

(60) Provisional application No. 61/683,923, filed on Aug. 16, 2012, provisional application No. 61/705,701, (Continued)

(51) Int. Cl.

| | |
|---|---|
| *H04N 11/02* | (2006.01) |
| *H04N 19/587* | (2014.01) |
| *H04N 19/70* | (2014.01) |
| *H04N 19/46* | (2014.01) |
| *H04N 19/463* | (2014.01) |

(Continued)

(52) U.S. Cl.
CPC ..... *H04N 19/00751* (2013.01); *H04N 19/132* (2014.11); *H04N 19/174* (2014.11); *H04N 19/187* (2014.11); *H04N 19/33* (2014.11); *H04N 19/46* (2014.11); *H04N 19/463* (2014.11); *H04N 19/587* (2014.11); *H04N 19/70* (2014.11)

(58) Field of Classification Search
CPC .......... H04N 19/00751; H04N 19/132; H04N 19/174; H04N 19/187; H04N 19/33; H04N 19/46; H04N 19/463; H04N 19/587; H04N 19/70
See application file for complete search history.

(56) References Cited

U.S. PATENT DOCUMENTS

2006/0133486 A1* 6/2006 Boyce ............... 375/240.12
2007/0230575 A1* 10/2007 Han ............... 375/240.13
(Continued)

OTHER PUBLICATIONS

Scalable Video Coding Extension of the H.264/AVC Standard 50th International Symposium ELMAR-2008, Sep. 10-12, 2008, Zadar, Croatia, Rimac-Drlje et al.*

(Continued)

*Primary Examiner* — Mohammed Rahaman
(74) *Attorney, Agent, or Firm* — Condo Roccia Koptiw LLP

(57) ABSTRACT

Methods and apparatus may be used to signal slice skip mode of a multiple layer scalable coding system. A correlation between the corresponding regions of video signals in multiple layers and inter-layer processing techniques may make it possible to infer a slice or picture in the enhancement layer from the corresponding region in a base layer picture. Accordingly, a video stream may be encoded to indicate that an enhancement layer slice or picture may be skipped.

24 Claims, 14 Drawing Sheets

Related U.S. Application Data filed on Sep. 26, 2012, provisional application No. 61/828,369, filed on May 29, 2013.

(51) Int. Cl.
  *H04N 19/132* (2014.01)
  *H04N 19/174* (2014.01)
  *H04N 19/187* (2014.01)
  *H04N 19/33* (2014.01)

(56) References Cited

U.S. PATENT DOCUMENTS

| | | | | |
|---|---|---|---|---|
| 2008/0101470 | A1* | 5/2008 | Hong et al. | 375/240.14 |
| 2009/0003445 | A1* | 1/2009 | Ying et al. | 375/240.15 |
| 2011/0182354 | A1 | 7/2011 | Jang et al. | |
| 2012/0044322 | A1* | 2/2012 | Tian et al. | 348/43 |
| 2012/0213275 | A1* | 8/2012 | Kwon et al. | 375/240.12 |

OTHER PUBLICATIONS

Boyce et al., "High Level Syntax Hooks for Future Extensions", Vidyo, Qualcomm, Joint Collaborative Team on Video Coding (JCT-VC) of ITU-T SG16 WP3 and ISO/IEC JTC1/SC29/WG11, Document: JCTVC-H0388, Feb. 1-10, 2012, pp. 1-6.

Boyce et al., "High-Level Syntax Modifications for SHVC", Vidyo, Joint Collaborative Team on Video Coding (JCT-VC) of ITU-T SG16 WP3 and ISO/IEC JTC1/SC29/WG11, Document: JCTVC-M0046, Apr. 18-26, 2013, pp. 1-12.

Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, Document: JCTVC-I1003_d9, Apr. 27-May 7, 2012, 280 pages.

Chen et al., "SHVC Working Draft 2", ISO/IEC, Joint Collaborative Team on Video Coding (JCT-VC) of ITU-T SG16 WP3 and ISO/IEC JTC1/SC29/WG11, Document: JCTVC-MI008_vI, Apr. 18-26, 2013, 53 pages.

Dong et al., "Description of Scalable Video Coding Technology Proposal by InterDigital Communications", InterDigital Communications, LLC, Joint Collaborative Team on Video Coding (JCT-VC) of ITU-T SG16 WP3 and ISO/IEC JTC1/SC29/WG11, Oct. 10-19, 2012, pp. 1-30.

ISO/IEC, "3D Video Standardization Plans", ISO/IEC W12557, Feb. 2012.

ISO/IEC, "Draft Requirements for the Scalable Enhancement of HEVC", ISO/IEC JTC-1/SC29/WG11 W12783, Nov. 2011.

ISO/IEC, "Draft Use Cases for the Scalable Enhancement of HEVC", ISO/IEC JTC-1/SC29/WG11 W12782, May 2012.

ISO/IEC, "Information Technology—Coding of Audio-Visual Objects—Part 2: Visual", International Standard, Ref. No. ISO/IEC 14496-2:2001(E), Dec. 1, 2001, 536 pages.

ISO/IEC, "Information Technology—Coding of Moving Pictures and Associated Audio for Digital Storage Media at up to about 1,5 Mbit/s—Part 2: Video", International Standard ISO/IEC 11172-2:1993, Technical Corrigendum 3, Ref. No. ISO/IEC 11172-2:1993/Cor.3:2003(E), Nov. 1, 2003, pp. 1-6.

ISO/IEC, "Information Technology—Generic Coding of Moving Pictures and Associated Audio Information: Video", International Standard ISO/IEC 13818-2:2000 Technical Corrigendum 1, Ref. No. ISO/IEC 13818-2:2000/Cor.1:2002(E), Mar. 1, 2002, 4 pages.

ISO/IEC, "Preliminary Call for Proposals on the Scalable Video Coding Extensions of HEVC", ISO/IEC JTC-1/SC29/WG11 W12784, May 2012.

ITU, "Codec for Audiovisual Services AT n×384 kbit/s", CCITT, H.261, Nov. 1988, 14 pages.

ITU-T, "Advanced Video Coding for Generic Audiovisual Services", ITU-T Recommendation H.264, Nov. 2007, 564 pages.

ITU-T, "Advanced Video Coding for Generic Audiovisual Services", ITU-T Recommendation H.264, Mar. 2010, 676 pages.

ITU-T, "Video Coding for Low Bit Rate Communication", ITU-T Recommendation H.263, Mar. 1996, 52 pages.

Kim et al., "HM7: High Efficiency Video Coding (HEVC) Test Model 7 Encoder Description", ISO/IEC, Joint Collaborative Team on Video Coding (JCT-VC) of ITU-T SG16 WP3 and ISO/IEC JTC1/SC29/WG11, Document: JCTVC-I1002, Apr. 27, May 7, 2012, 42 pages.

Ohm, Jens-Rainer, "Advances in Scalable Video Coding", Proceedings of The IEEE, vol. 93, No. 1, Jan. 2005, pp. 42-56.

Rimac-Drlje et al., "Scalable Video Coding Extension of the H.264/AVC Standard", 50th International Symposium ELMAR-2008, Zadar, Croatia, Sep. 10-12, 2008, pp. 1-4.

ISO/IEC, "Requirements of the scalable enhancement of HEVC", ISO/IEC JTC-1/SC29/WG11 W12783, May 2012.

* cited by examiner

SLICE BASE SKIP MODE SIGNALING FOR MULTIPLE LAYER VIDEO CODING

CROSS REFERENCE TO RELATED APPLICATIONS

This application claims the benefit of U.S. Provisional Patent Application 61/683,923, entitled "Slice Base Skip Mode Signaling for Multiple Layer Video Coding," which was filed on Aug. 16, 2012; U.S. Provisional Patent Application 61/705,701, entitled "Slice Base Skip Mode Signaling for Multiple Layer Video Coding," which was filed on Sep. 26, 2012; and U.S. Provisional Patent Application 61/828,369, entitled "Slice Base Skip Mode Signaling for Multiple Layer Video Coding," which was filed on May 29, 2013 the contents of which are hereby incorporated by reference herein.

BACKGROUND

Various digital video compression technologies have been developed and standardized to enable efficient digital video communication, distribution, and consumption. These video compression technologies hope to improve coding efficiency.

Correlation between corresponding regions of video signals in multiple layers and inter-layer processing techniques, such as up-sampling filter design for spatial scalability, may make it possible to infer a slice in an enhancement layer picture from a corresponding region in a base layer picture.

SUMMARY

Disclosed herein are methods and apparatus to signal a slice skip mode for a multiple layer scalable coding system. Correlation between corresponding regions of video signals in multiple layers and inter-layer processing techniques, such as up-sampling filter design for spatial scalability, may make it possible to infer a slice in an enhancement layer picture or an enhancement layer picture from a corresponding region in a base layer picture. Accordingly, an enhancement layer slice or picture may be skipped as it may be inferred from a base layer slice. To indicate that the enhancement layer slice or picture may be skipped, efficient signaling at a high level may be provided. For example, signaling may be provided in a slice header or in a network abstraction layer (NAL) unit header. This may, for example, improve coding efficiency of scalable video coding.

A wireless transmit/receive unit (WTRU) may be provided that may be used for video encoding. The WTRU may include a processor. The processor may be configured to perform a number of actions. For example, the processor may be configured to determine a slice of a picture to be skipped using a reference region of a reference picture. The slice may be part of the picture or the picture. A skip slice mode may be set in a slice header to indicate that the slice of the picture is to be skipped, for example, during decoding. An address of the reference region may be inserted into the slice header. The slice header may be encoded into a bit stream.

A WTRU may be provided that may be used for video decoding. The WTRU may include a processor. The processor may be configured to perform a number of actions. For example, the processor may be configured to determine from a slicer header that a slice of a picture in a bit stream may have been skipped during encoding. The slice may be part of the picture or the picture. A reference layer identity, a reference picture identity, and a reference region address may be retrieved from the slicer header. A reference picture may be retrieved using the reference layer identity and the reference picture identity. The slice may be generated using a reference region of the reference picture.

A method may be provided for video encoding. A slice of a picture to be skipped may be determined using a reference region of a reference picture. The slice may be part of the picture or the picture. A skip slice mode may be set in a slice header to indicate that the slice of the picture is to be skipped. An address of the reference region and a reference picture type may be inserted into the slice header. The reference picture type may indicate whether the reference picture is a hybrid inter-layer reference (HILR) picture or an inter-layer reference (ILR) picture. The slice header may be encoded into a bit stream.

The Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to any limitations that solve any or all disadvantages noted in any part of this disclosure.

BRIEF DESCRIPTION OF THE DRAWINGS

A more detailed understanding may be had from the following description, given by way of example in conjunction with the accompanying drawings.

DETAILED DESCRIPTION

Figure 1:
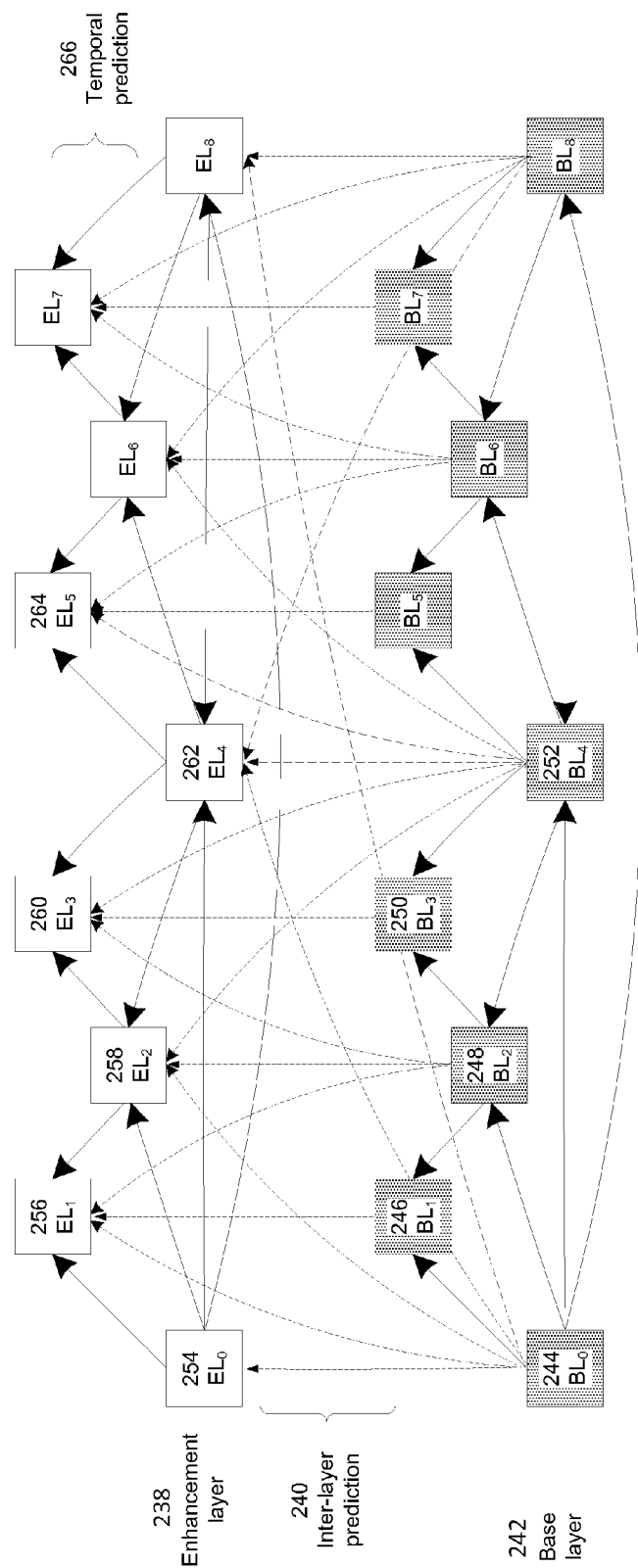
FIG. 1 depicts an example of a temporal and/or inter-layer prediction structure that may be used for scalable video coding.

Disclosed herein are methods and apparatus to signal a slice skip mode for a multiple layer scalable coding system. Correlation between corresponding regions of video signals in multiple layers and inter-layer processing techniques, such as up-sampling filter design for spatial scalability, may make it possible to infer a slice or picture in an enhancement layer picture from a corresponding region in a base layer picture. Accordingly, an enhancement layer slice or picture may be skipped as it may be inferred from a base layer slice. To indicate that the enhancement layer slice or picture may be skipped, efficient signaling at a high level may be provided. For example, signaling may be provided in slice header or in NAL unit header. This may, for example, to improve coding efficiency of a scalable video coding.

A method may be used to encode a slice for multiple layer scalable coding. It may be determined that a slice may have been skipped. The slice may be part of a picture or the picture. A slice skip mode may be set in a slice header when the slice may be determined to be skipped. It may be determined whether an explicit signal may have been used to indicate that the slice has been skipped.

A method may be used to decode a slice in a multiple layer scalable coding. A slice header may be parsed. It may be determined whether a slice may have been skipped. The slice may be part of the picture or the picture. When the slice may have been determined to be skipped, the slice may be reconstructed using data from the slice header.

A method may be used to provide a motion vector prediction for a skipped slice. A base layer picture may be received. A motion vector mapping may be generated from the base layer picture. A motion vector prediction may be generated from the motion vector mapping. An enhanced layer picture may be generated from the motion vector prediction.

A method may be used for slice encoding for multiple layer scalable coding. A skip slice mode may be set in a slice header. A hybrid sample prediction may be enabled. An inter-layer reference picture may be determined and may be used to predict a skipped slice. A flag may be set in the slice header to indicate the determined inter-layer reference picture.

A method may be used to decode a slice in a multiple layer scalable coding. A slice header may be parsed. A slice that may have been skipped may be determined. The slice may be part of the picture or the picture. It may be determined that a hybrid sample prediction may be enabled. An inter-layer reference picture may be determined using the slice header. A skipped slice may be formed or predicted using the determined inter-layer reference picture.

A wireless transmit/receive unit (WTRU) may be provided that may be used for video encoding. The WTRU may include a processor. The processor may be configured to perform a number of actions. For example, the processor may be configured to determine a slice of a picture that may be skipped using a reference region of a reference picture. The slice may be part of the picture or the picture. The reference picture may be a hybrid inter layer reference (HILR) picture, or an inter-layer reference (ILR) picture. The reference picture may or may not be co-located with the picture. The reference region may be up-scaled so that a size of the reference region may match a size of the slice. The reference picture may be up-scaled to generate an up-scaled reference picture and a reconstructed reference region may be identified within the up-scaled reference picture that may match a size of the slice using the address of the reference region. A hybrid inter-layer reference picture may be generated using an up-scaled motion vector from a base layer picture and a texture from an enhancement layer picture. A skip slice mode may be set in a slice header to indicate that the slice of the picture is to be skipped, for example, during decoding. An address of the reference region may be inserted into the slice header. The slice header may be encoded into a bit stream.

A WTRU may be provided that may be used for video decoding. The WTRU may include a processor. The processor may be configured to perform a number of actions. For example, the processor may be configured to determine from a slicer header that a slice of a picture in a bit stream may have been skipped during encoding. The slice may be part of the picture or the picture. A reference layer identity, a reference picture identity, and a reference region address may be retrieved from the slicer header. A reference picture may be retrieved using the reference layer identity and the reference picture identity. The slice may be generated using a reference region of the reference picture.

A method may be provided for video encoding. A slice of a picture to be skipped may be determined using a reference region of a reference picture. The slice may be part of the picture or the picture. A skip slice mode may be set in a slice header to indicate that the slice of the picture is to be skipped. An a reference picture type may be inserted into the slice header. The reference picture type may indicate whether the reference picture is a hybrid inter-layer reference (HILR) picture or an inter-layer reference (ILR) picture. The slice header may be encoded into a bit stream.

Video applications, such as IPTV, video chat, mobile video, and streaming video, may be deployed in a heterogeneous environment. Such heterogeneity may exist on a client side and/or a network side. For example, on the client side, there may be a three-screen scenario that may include three display devices, such as a smart phone, a tablet, and TV. The three screens may have different display spatial resolutions. On the network side, video may be transmitted across a network such as the Internet, a WiFi network, a mobile (3 G and 4 G) network, the like, or any combination thereof.

To improve user experience and video quality of service in such heterogeneous environments, scalable video coding may be used. For example, scalable video coding may allow a signal to be encoded at a high resolution, while the signal may be decoded in a number of different resolutions that may depend on a rate and resolution set by an application and/or supported by a client device. The resolution may include a number of video parameters. The video parameters may include spatial resolution, such as a picture size; a temporal resolution, such as a frame rate; a video quality, such as mean opinion score (MOS), speak signal-to-noise ratio (PSNR), structural similarity (SSIM), or visual quantum mechanics (VQM); the like, or any combination thereof. The video parameters may include a chroma format, such as YUV420, YUV422, or YUV444; a bit-depth, such as 8-bit, or 10-bit video; complexity; view; gamut; aspect ratio, such as 16:9, 4:3; the like, or any combination thereof.

High efficiency video coding (HEVC) may support scalable coding. For example, a scalable extension of HEVC may support spatial scalability such that a scalable bit stream may include signals at more than one spatial resolution. A scalable extension of HEVC may support quality scalability such that the scalable bit stream may include signals at more than one quality level. Scalability may also support 3D video. For example, a scalable bit stream may include both 2D and 3D video signals.

Although spatial and quality scalability may be discussed herein with regard to HEVC, the embodiments disclosed herein may be extended to other types of scalabilities. Moreover, although an enhancement layer and a base layer may be discussed herein, the embodiments disclosed herein may be extended to any number of layers that may be present.

FIG. 1 depicts an example of a temporal and/or inter-layer prediction structure that may be used for scalable video coding. FIG. 1 may provide a design for scalable coding and may provide a scalability extension of HEVC. As shown in FIG. 1 at 240, inter-layer reference (ILR) pictures may be used to predict enhancement layer (EL) 238. The prediction of enhancement layer (EL) 238 may be formed by a motion compensated prediction from inter-layer reference (ILR) pictures that may be processed from the base layer (BL) 242. For example, $EL_0$ at 254 may be formed or predicted from ILR pictures that have been processed from $BL_0$ at 244. As another example, $EL_1$ at 256 may be predicted or formed from ILR pictures that may be processed from $BL_0$ at 244, $BL_1$ at 246, and/or $BL_2$ at 248. EL 238 may be predicted or formed, for example, after up-sampling when the spatial resolutions between the two layers may be different, after denoising and/or restoration when the base layer picture may be of low quality, after inverse tone mapping when the base layer bit depth may be lower than the enhancement layer bit depth, or the like.

As shown at 266, temporal reference pictures within enhancement layer 238 may be used to predict or create enhancement layer pictures, such as $EL_0$ at 254. For example, $EL_2$ at 258 may be formed or predicted using a motion compensated prediction from temporal reference pictures, such as $EL_0$ at 254 and $EL_4$ at 262.

A combination of prediction sources may be used to create and/or predict enhancement layer frames in enhancement layer 238. For example, $EL_5$ at 264 may be created using temporal reference pictures $EL_4$ at 262 and an ILR picture created from $BL_4$ at 252. As another example, $EL_3$ at 260 may be formed or predicted using $BL_4$ at 252, $BL_3$ at 250, $BL_2$ at 248, $EL_2$ at 258, and/or $EL_4$ at 262. Full reconstruction of the lower layer pictures may be performed.

A slice as an integer number of coding tree blocks may be used in HEVC. A picture may include one or more slices. A HEVC skip mode for a coding unit (CU) may be used to improve compression efficiency. When a CU may be coded in skip mode, its motion information, such as motion vectors, reference picture index, reference picture list usage flag, or the like, may not be transmitted in the bit stream. The motion information may be inferred from multiple candidates that may be formed by spatial and temporal neighboring prediction units (PU). Residual coefficients may be inferred to be zero in skip mode.

In scalable video coding, a PU of an enhancement layer slice may be formed or predicted from other slices of the same enhancement layer, or may be formed or predicted from the slices of lower layers. Depending on the correlation between the enhancement layer and the base layer, such as the correlation between the current enhancement layer slice and the corresponding region in the co-located base picture, it may be possible to infer a slice of the enhancement layer from a corresponding region in the base layer reconstructed picture. For example, inter-layer processing of the base layer reconstruction may be performed. Compared to using the skip mode on coding unit level, which may send a skip flag and index information for a PU even when the slice may be skipped, skip mode at the slice level may achieve bit savings since additional information in the coded slice may not be sent. Coding efficiency of a scalable video coding may be improved by signaling of a skipped slice.

Scalable video coding may support multiple layers, and a layer may be designed to enable spatial scalability, temporal scalability, SNR scalability, or any other type of scalability. A scalable bit stream may include mixed scalability layers and an enhancement layer may depend on one or more lower layers to be decoded.

Figure 2:
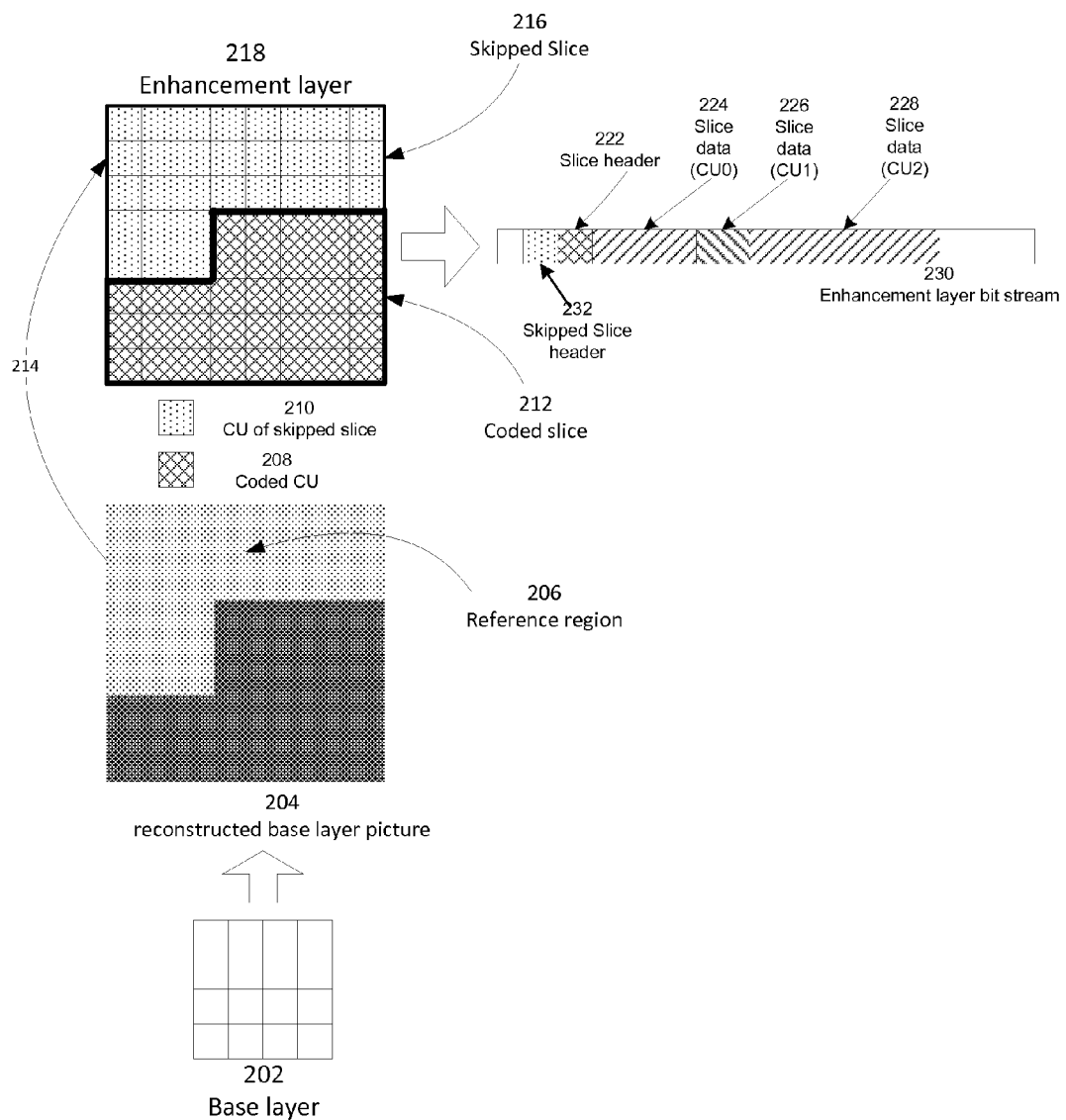
FIG. 2 depicts an example method for signaling a skipped slice in a scalable video coding.

FIG. 2 depicts an example method for signaling a skipped slice in a scalable video coding. For example, FIG. 2 depicts an example of signaling that skipped slice 216 may be skipped in a two layer scalable coding system. Skipped slice 216 may be in enhancement layer 218 and may correspond to reference region 206 of reconstructed base layer picture 204. Skipped slice header 232 may be used to signal that skipped slice 216 may be skipped. To determine and/or signal skipped slice 216, base layer picture 202 may be up-sampled to create a reconstructed base layer picture, such as reconstructed base layer picture 204. Base layer picture 202 may be decoded from a bit stream. Reconstructed base layer picture may be created by up-sampling a base layer picture that may be decoded from the bit stream. The reconstructed base layer picture may be a reference picture. For example, reconstructed base layer picture 204 may be a reference picture. Reconstructed base layer picture 204 may be processed via linear and/or non-linear inter-layer processing mechanisms to improve prediction accuracy. For example, if the resolution of base layer 202 may have a different resolution than the resolution of enhancement layer 218, base layer picture 202 may be up-sampled to create reconstructed base layer picture 204. If base layer picture 202 may be of a lower quality, then base layer picture 202 may be de-noised. This may occur, for example, when the base layer picture may be encoded with a higher quantization parameter (QP). When a base layer picture may represent a different view, which may occur when using 3D video coding, then disparity compensation may be applied to create a reference picture. For example, when decoding 3D video, a BL may represent a left view while the EL may represent a right view. The BL that may represent the left view may be used to create a reference picture, which may be used to predict the right view represented by the EL.

Reconstructed base layer picture 204 may be used for inter-layer prediction of an enhancement layer slice, such as skipped slice 216. For example, at 214, it may be determined that skipped slice 216 of enhancement layer 218 may be skipped as skipped slice 216 may correspond to reference region 206. It may be signaled at a high level that that skipped slice 216 may be skipped during encoding and/or decoding. For example, a skip mode may be signaled in skipped slice header 232 to indicate that skipped slice 216 may be skipped during encoding and/or decoding. Skipped slice header 232 may be encoded in enhancement layer bit stream 230. The enhancement layer encoder may bypass coding of skipped slice 216. For example, CUs for skipped slice 216, such as the CUs of skipped slice at 210, may not be included in enhancement layer bit stream 230.

It may be determined that coded slice 212 may be encoded. For example, a processor, that may be an encoder, may encode CUs for coded slice 212, such as coded CU at 208, into enhancement layer bit stream 230. Slice header 222 for coded slice 212 may be included in enhancement layer bit stream 230.

Enhancement layer bit stream 230 may include slice data 224, slice data 226, slice data 228, slice header 222, and skipped slice header 232. Skipped slice header 232 may indicate that skipped slice 216 may be skipped. Slice header 222 may indicate that slice data 224, slice data 226, and slice data 226 may belong to coded slice 212. The enhancement layer bit stream 230 may be sent to a decoder. The decoder may receive the enhancement layer bit stream 230 and may construct coded slice 212 using slice header 222, slice data 224, slice data 226, and slice data 228. The decoder may constructed skipped slice 216 by up-sampling a base layer picture, creating a reconstructed base layer picture, and copying a reference region from the reconstructed base layer picture as that may corresponded to skipped slice 216.

Signals disclosed herein may be used to indicate a skipped slice and may be used to indicate related information such as a reference region, motion information, slice range, or the like.

A slice type may be used to indicate that a slice may be skipped, for example, during encoding and/or decoding. Hybrid video coding standards, such as MPEG-1, MPEG-2, H264 and HEVC, may use 3 coded slice types, I slice, P slice and B slice in the slice header. A skipped slice may be added to indicate that the current slice may be skipped. For backward compatibility, the slice type, skipped slice, may be valid when the slice may be an enhancement layer slice, which may be indicated by a layer id for the slice.

A bit flag may be used to indicate that a slice may be skipped, for example, during encoding and/or decoding. For example, a bit flag may be added to the slice header to indicate if a current slice may be skipped or not. For backward compatibility, the skipped slice flag may be signaled if the slice may be an enhancement layer slice, which may be indicated by a layer id for the slice.

A network abstraction layer (NAL) unit may be used to indicate that a slice may be skipped. For example, a NAL type, SKIP_SLICE, may be defined at in a NAL unit header such that applications may detect a skipped slice at a NAL unit level. For backward compatibility, the NAL type SKIP_SLICE may be signaled if the slice may be an enhancement layer slice, which may be indicated by a layer id for the slice.

Figure 3:
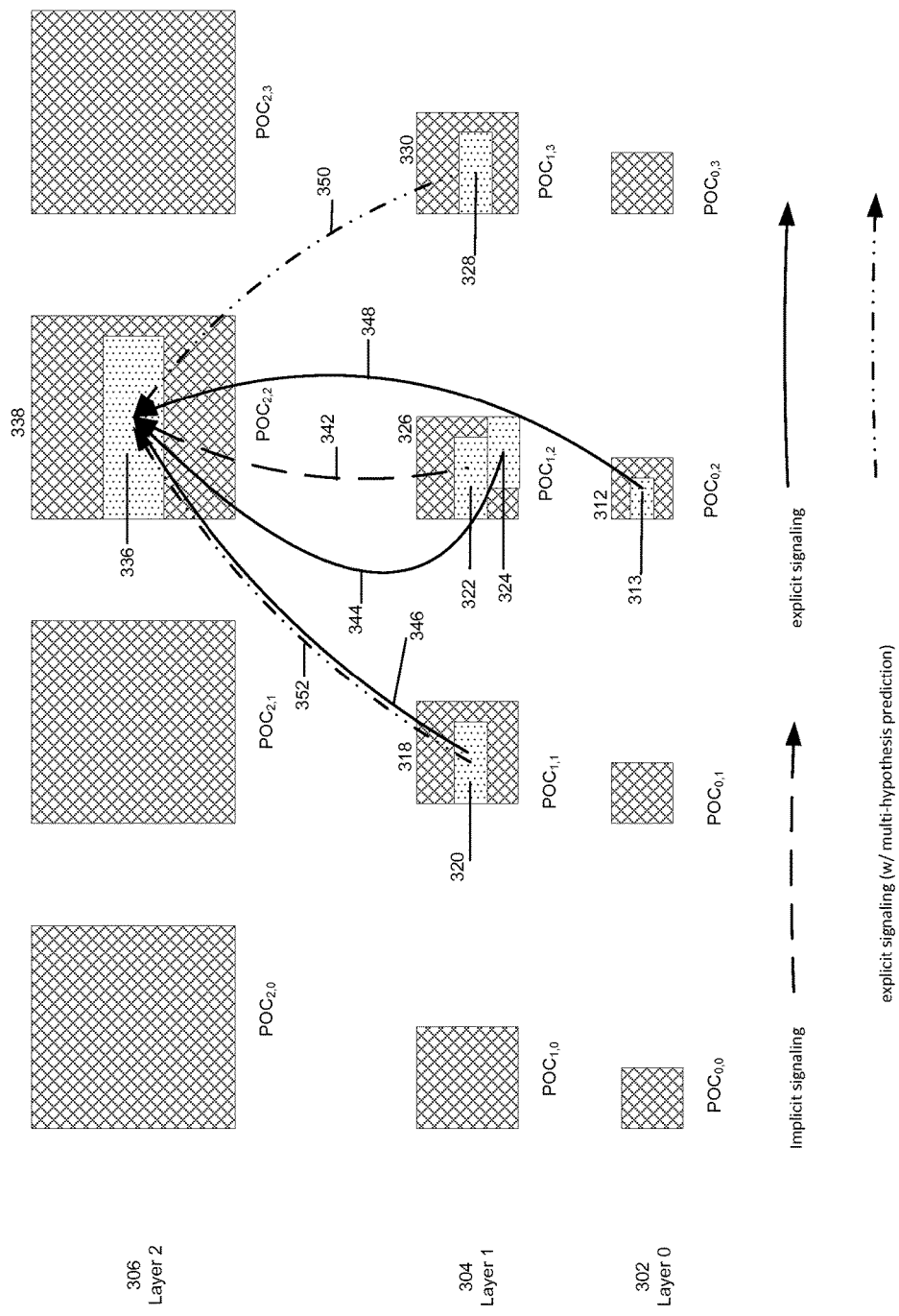
FIG. 3 depicts example methods for signaling a skipped slice.

FIG. 3 depicts example methods for signaling a skipped slice. Methods for signaling a skipped slice may be explicitly signaled, implicitly signaled, or a combination thereof. Methods for encoding and/or decoding a skipped slice may depend on whether an explicit signal or an implicit signal may be used. For example, an explicit signal may be used to indicate a reference layer that may be used to create a reconstructed picture, and a reference region to be used from the reconstructed picture. The reference region may be used to create the skipped slice. When an explicit signal may not be used, it may be determined that a skipped slice has been implicitly signaled. A reconstructed picture that may be co-located to the picture, which may include the skipped slice, may be selected from a reference layer. A reference region that may be in a co-located region to skipped slice may be used to create the skipped slice. The reference region may be up-sampled, de-noised, disparity compensated, or the like. Layer priority and dependency may be signaled at a sequence level, for example, using Video Parameter Sets (VPS).

As shown in FIG. 3, implicit signaling may occur at 342. For example, at 342, skipped slice 336 of $POC_{2,2}$ at 338 may be predicted from a corresponding region, such as reference region 322 of $POC_{1,2}$. This may occur after up-sampling. Layer 1 at 304 and layer 0 at 302 may be reference layers for layer 2 at 306. Layer 1 at 304 may have a higher priority than layer 302. Reference region 322 in $POC_{1,2}$ may be inferred based on a start address and an end address of skipped slice 336 in $POC_{2,2}$. The start address of skipped slice 366 may be signaled in a slice header. The end address of skipped slice 336 may be unknown from the slice header. A number of options may be used to identify the end address. For example, the end address may be identified by using a decoder that may parse the next slice header and may infer the end address of the current slice from the start address of the next slice. As another example, the address at which a skipped slice ends may be signaled in the current slice header, which may minimize decoding latency. As another example, a number of skipped coding tree blocks (CTB) may be used to indicate the slice end address and may be signaled.

Explicit signaling may occur at 346, 344, 348, 350, and 352. If explicit signaling may be used, a reference region may be taken from a reference picture of a reference layer. A position of the reference region may be different from a position of the slice in the reference layer. The skipped slice may be formed or predicted from more than one reference region from different reference pictures of different reference layers.

At 346, skipped slice 336 in picture order count $(POC)_{2,2}$ at 338 may be predicted from reference region 320 in $POC_{1,1}$ at 318. $POC_{1,1}$ at 318 may not be a co-located reference picture for $POC_{2,2}$ at 338. Reference region 320 may correspond to a region of skipped slice in 336 in $POC_{2,2}$ at 338.

At 344, skipped slice 336 in $POC_{2,2}$ at 338 may be predicted from reference region 322 in $POC_{1,2}$ at 326. $POC_{1,2}$ at 326 may be a co-located reference picture for $POC_{2,2}$ at 338. Reference region 320 may be a region that may not correspond to a region of skipped slice 336 in $POC_{2,2}$ at 338. $POC_{1,2}$ at 326 may be in layer 1, which may be the highest priority reference layer for layer 2.

At 348, skipped slice 336 in $POC_{2,2}$ at 338 may be predicted from reference region 313 in $POC_{0,2}$ at 312. $POC_{0,2}$ at 312 may be a co-located reference picture for $POC_{2,2}$ at 338. Reference region 313 may be a region that may correspond to a region of skipped slice 336 in $POC_{2,2}$ at 338. $POC_{0,2}$ at 312 may be in layer 0, which may have a lower priority than layer 1.

As shown in FIG. 3, multi-hypothesis prediction may be used at 352 and 350. For example, skipped slice 336 in $POC_{2,2}$ at 338 may be predicted from the reference region 320 in $POC_{1,1}$ at 318 and reference region 328 in $POC_{1,3}$ at 330. This may be done, for example, to offer the flexibility to synthesize the reference region.

A number of methods disclosed herein may be used to signal the location of a reference region, such as reference region 320, reference region 322, reference region 324, reference region 313, and reference region 328. For example, a reference layer index; an identity of a reference picture, such as a picture order count (POC) value or the distance between a current picture and the reference picture; and/or the start and end address of the reference region, such as a CTB address or pixel position; or the like, may be inserted into a slice header to indicate a location of the reference region. As another example, a reference layer index, a reference picture identity, a start address of the reference region, and/or the total number of coding tree blocks (CTB) may be inserted into a slice header to indicate the location of the reference region. As another example, a reference layer index, a reference picture identity, and relative information such as motion or disparity information may be used to indicate the location of the reference region. The motion information or disparity information may be applied on the slice region and may indicate the relative movement (in X and Y dimension) between the skipped slice and its reference region. As another example, where more than one reference region may be used to predict the skipped slice, a number of reference regions, reference layer IDs, reference picture POCs, and relative information such as motion vector of the reference regions, may be signaled. Additionally, instead of averaging reference regions, different weights may be assigned to different reference regions. When weighting may be applied, weighting factors associated with reference regions may be signaled in the slice header.

The skipped slice related signals described herein may also be included in Adaptation Parameter Set (APS). This may lower signaling overhead related to skipped slices if more than one slice may be skipped within a picture and they share the same relationship with their respective reference regions.

The skipped slice related signaling described herein may be valid for enhancement layer slices. This may be done, for example, to maintain backward compatibility with single layer HEVC standard.

If a slice may be a skipped slice, the syntax elements in the slice header used for CU level coding may be skipped to reduce overhead. For example, parameters for an in-loop filter, such as sample adaptive offset (SAO) filter or a deblocking filter, and entropy coding may be not in a slice header.

To maintain the decoded picture buffer (DPB) operation consistency, reference pictures whose status may be subject to change in the DPB may be signaled even if the slice may be skipped. This may be applied to slices of the picture. The reference picture set (RPS) signaling in the slice header may be maintained (i.e., may not be bypassed) if the slice header may be a skipped slice. RPS signaling that may be specified in the slice header may be removed and a set of syntax elements may be inserted to indicate which reference picture may be subject to DPB status change after coding of the current picture. For example, a subset of RPS-like signals may be inserted in the skipped slice header to indicate that those reference pictures may be marked "unused for reference" and a new reference picture may be marked as "used for short-term reference" or "used for long-term reference."

Figure 4:
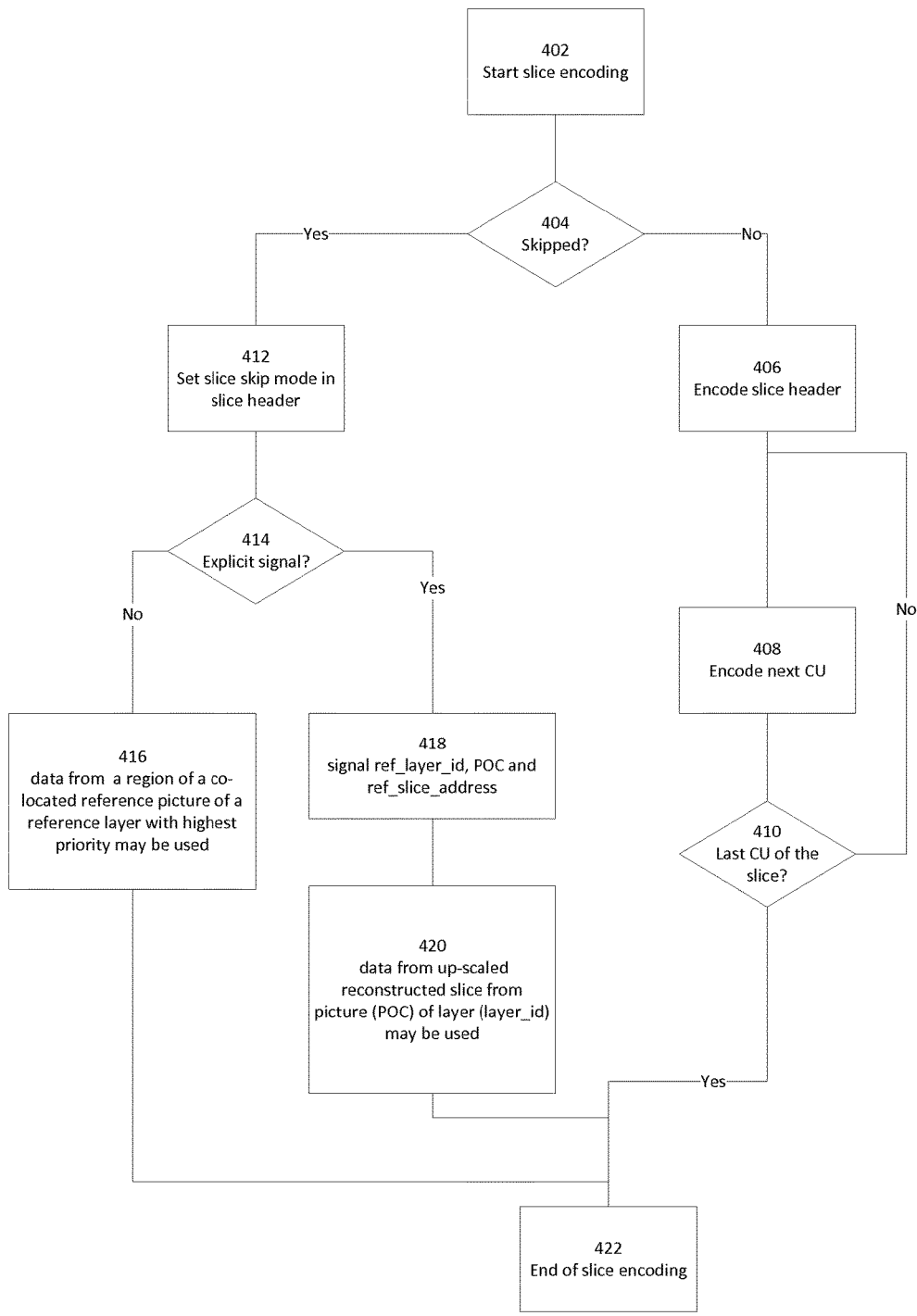
FIG. 4 depicts an example method for slice encoding.

FIG. 4 depicts an example method for slice encoding. For example, a reference layer index, a POC value, and a reference slice address may be inserted into a slice header to indicate the location of the reference region that may be used to reconstruct the skipped slice. The skipped slice may be a portion of a picture that may be skipped, a picture that may be skipped, or the like.

At 402, the encoding of a slice into a bit stream may start. The bit stream may be enhancement layer bit stream 230 shown with respect to FIG. 2. Referring again to FIG. 4, at 404 it may be determined whether a slice of a picture may be skipped. This may be done, for example, by analyzing a reference region of a reference picture to determine if the reference region may be used to reconstruct the skipped slice during decoding. At 406, it may be determined that the slice may not be skipped and the slice header may be encoded. The slice header may be encoded in the bit stream and may be followed by a slice segment that may have slice data, such as a CU, that may be included or encoded in the bit stream. At 408, a CU may be encoded in the bit stream. At 410, a determination may be made as to whether the CU encoded at 408 may be the last CU to encode for the slice. If the CU may not be the last CU to encode, the next CU to encode may be identified and encoded into the bit stream at 408; the process may be repeated until the last CU may be encoded into the bit stream. If the CU may be the last CU to encode, then the encoding of the slice into the bit stream may end at 422.

At 412, it may be determined that the slice may be skipped and a slice skip mode made be set in a slice header. The slice skip mode may indicate that the slice may be skipped. At 414, it may be determined whether explicit or implicit signaling may be used to indicate that the slice may be skipped.

At 418, a skip slice header may be encoded in the bit stream when explicit signaling may be used to indicate that the slice may be skipped For example, an explicit signal, such as the skip slice header, may indicate a reference layer, a reference picture, and a reference region to be used from the reference picture to reconstruct the skipped slice. For example, the reference region may be used to create the skipped slice. The skip slice header may include information used to indicate a location of a reference region of a reference picture that may be used to predict or create the skipped slice. For example, the information in the skip slice header may include a reference layer index; an identity of a reference picture, such as a picture order count (POC) value or the distance between a current picture and the reference picture; and/or the start and end address of the reference region, such as a CTB address or pixel position; or the like. As another example, the information in the skip slice header may include a reference layer index, a reference picture identity, a start address of the reference region, a total number of coding tree blocks (CTB), or the like. As another example, the information in the skip slice header may include a reference layer index; a reference picture identity; relative information, such as motion or disparity information; or the like. The motion information or disparity information may be applied on the slice region and may indicate the relative movement (in X and Y dimension) between the skipped slice and its reference region. As another example, where more than one reference region may be used to predict the skipped slice, the information in the skip slice header may include a number of reference regions; reference layer IDs; reference picture POCs; relative information, such as motion vector of the reference regions; or the like. The slice header may be slice header 232 shown with respect to FIG. 2.

Referring again to FIG. 4, at 420, a reference region from a reference picture may be identified. For example, a reference region from the reference picture may be identified so that the reference region may be used to reconstruct the skipped slice. This may be done, for example, to allow encoding of the next slice to occur when the skipped slice may not be encoded in the bit stream. The reference region may be taken from a reference picture of a reference layer. A position of the reference region in the reference picture may be different from a position of the skipped slice. The skipped slice may be formed or predicted from more than one reference regions from different reference pictures of different reference layers.

The reference picture may be the reference picture indicated by the skipped slice header. For example, the skipped slice header may indicate that the reference picture may be used to create or predict the skipped slice. As another example, the skipped slice header may indicate a reference region of the reference picture that may be used to create or predict the skipped slice, which may be used to reconstruct the skipped slice.

The reference region may be used to encode additional slices. For example, a base layer picture may be up-sampled to create a reconstructed base layer picture. The base layer picture or the reconstructed base layer picture may be the reference picture. The reference picture may be processed via linear and/or non-linear inter-layer processing mechanisms to improve prediction accuracy. A reference region from the reference picture may be used to predict the skipped slice. For example, a reference region from the reference picture may be used for inter-layer prediction of an enhancement layer slice that may be the skipped slice.

Because the skipped slice may not be encoded into the bit stream, the reference region that may be used to predict the skipped slice may be used to encode a next slice. At 422, the skipped slice header may be encoded into the bit stream while the reference region may not be encoded in to the bit stream.

At 416, data from a region of a reference picture may be identified. The reference picture may be a co-located reference picture and may have the highest priority within a multi-layer video coding. A skipped slice may be formed or predicted from the reference region that may correspond to the skipped slice. The slice to be encoded may be part of a multi-layer video that may include, for example, layer 0, layer 1, and layer 2. Layer 2 may be an enhancement layer. Layer 1 may be another enhancement layer. Layer 0 may be a base layer. Layer 2 may have higher priority than layer 1, and layer 1 may have higher priority than layer 0. Layer 2 pictures may be predicted from layer 1 reference pictures and/or layer 0 reference pictures. The reference region may be from a reference picture that may come from a reference layer with the highest priority. For example, the skipped slice may be in layer 2 and the reference region used to reconstruct the skipped slice may be from layer 1. Layer 1 may be a reference layer for layer 2 and may have a higher priority than layer 0. To allow the reference region to be inferred during decoding, the start address for the reference region may be inserted in a slice header. The end address for the reference region may or may not be inserted in the slice header. When the end address for the reference region is not inserted in the slice header, the end address may still be identified by the decoder. The end address may be identified by decoder by parsing the next slice header and inferring the end address of the current slice from the start address of the next slice. As another example, the address at which a skipped slice ends may be signaled in the current slice header, which may minimize decoding latency. As another example, a number of skipped coding tree blocks (CTB) may be used to indicate the slice end address and may be signaled. At 422, the slice header may be encoded into the bit stream.

Figure 5:
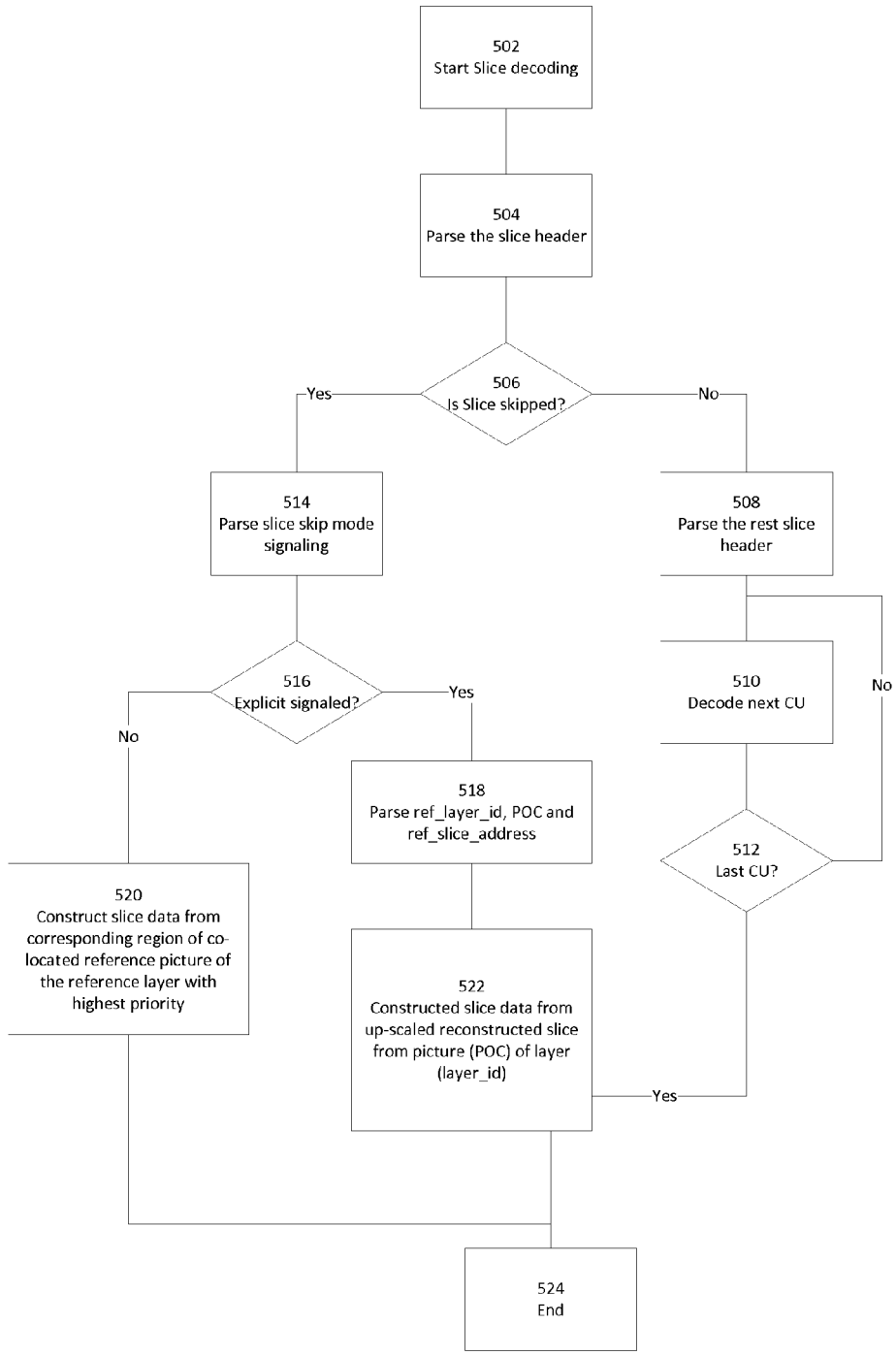
FIG. 5 depicts an example method for slice decoding.

FIG. 5 depicts an example method for slice decoding. For example, the reference layer index; the reference picture; the POC value or the distance between the current picture and the reference picture, and/or the start and end address of the reference region, in terms of CTB address or pixel position; or the like, may be read from a slice header to determine the location of the reference region. The skipped slice may be a portion of a picture that may be skipped, a picture that may be skipped, or the like.

At 502, the decoding of a slice from a bit stream may start. The bit stream may be enhancement layer bit stream 230 shown with respect to FIG. 2. Referring again to FIG. 5, at 504 a slice header may be parsed and a determination may be made as to whether the slice header indicates that the current slice may have been skipped. The slice header may be a skipped slice header.

At 508, the slice header may be parsed when the slice header may not indicate that the current slice may not have been skipped. The slice header may indicate that slice data, such as a CU, that may be encoded in the bit stream. At 510, a CU may be decoded from the bit stream. At 512, a determination may be made as to whether the CU decoded at 508 may be the last CU to decode for the slice as indicated by the slice segment. If the CU may not be the last CU to decode, the next CU to decode may be identified and decoded from the bit stream at 510; the process may be repeated until the last CU for the slice may be decoded from the bit stream. If the CU may be the last CU to decode, then the decoding of the slice from the bit stream may end at 524.

At 514, the slice header may be parsed to determine slice skip mode signaling when it may have been determined that the current slice may have been skipped. At 516, the slice skip mode signaling from the slice header may be analyzed to determine whether the slice skip mode signaling may have been implicit or explicit.

At 518, it may be determined that explicit signaling may have been used to signal that the current slice may have been skipped. For example, a skip slice header may have been encoded in the bit stream to indicate that the slice may have been skipped. The skip slice header or slice header may indicate a reference layer, a reference picture, and a reference region to be used from the reference picture to reconstruct the skipped slice. For example, the reference region may be used to reconstruct the skipped slice. The skip slice header may include information used to indicate a location of a reference region of a reference picture that may be used to predict or create the skipped slice. For example, the information in the skip slice header may include a reference layer index; an identity of a reference picture, such as a picture order count (POC) value or the distance between a current picture and the reference picture; and/or the start and end address of the reference region, such as a CTB address or pixel position; or the like. As another example, the information in the skip slice header may include a reference layer index, a reference picture identity, a start address of the reference region, a total number of coding tree blocks (CTB), or the like. As another example, the information in the skip slice header may include a reference layer index; a reference picture identity; relative information, such as motion or disparity information; or the like. The motion information or disparity information may be applied on the slice region and may indicate the relative movement (in X and Y dimension) between the skipped slice and its reference region. As another example, where more than one reference region may be used to predict the skipped slice, the information in the skip slice header may include a number of reference regions; reference layer IDs; reference picture POCs; relative information, such as motion vector of the reference regions; or the like. The slice header may be slice header 232 shown with respect to FIG. 2.

Referring again to FIG. 5, at 522, the skipped slice may be reconstructed using a reference region from a reference picture. For example, a reference region from a reference picture may be determined so that the reference region may be used to reconstruct the skipped slice. This may be done, for example, to allow the skipped slice to be reconstructed when skipped slice may not be encoded in the bit stream. The reference region may be taken from a reference picture of a reference layer. A position of the reference region in the reference picture may be different from a position of the skipped slice. The skipped slice may be formed or predicted from more than one reference region from different reference pictures of different reference layers.

The reference picture may be the reference picture indicated by the skipped slice header. For example, the skipped slice header may indicate that the reference picture may be used to create or predict the skipped slice. As another example, the skipped slice header may indicate a reference region of the reference picture that may be used to create or predict the skipped slice, which may be used to reconstruct the skipped slice.

The reference region may be used to reconstruct the skipped slice. For example, a base layer picture may be up-sampled to create a reconstructed base layer picture. The base layer picture or the reconstructed base layer picture may be the reference picture. The reference picture may be processed via linear and/or non-linear inter-layer processing mechanisms to improve prediction accuracy. A slice from the reference picture may be used to predict the skipped slice. For example, a slice from the reference picture may be used for inter-layer prediction of an enhancement layer slice that may be the skipped slice. The slice from the reference picture may be the reference region.

At 520, the skipped slice may be reconstructed from a reference region of a co-located reference picture when implicit signaling may be used. A skipped slice may be formed or predicted from a reference region that may correspond to the skipped slice. The slice to be decoded may be part of a multi-layer video that may include, for example, layer 0, layer 1, and layer 2. Layer 2 may be an enhancement layer. Layer 1 may be another enhancement layer. Layer 0 may be a base layer. Layer 2 pictures may be predicted from layer 1 reference pictures and/or layer 0 reference pictures. Layer 2 may have higher priority than layer 1, and layer 1 may have higher priority than layer 0. The reference region may be from a reference picture that may come from a reference layer with the highest priority. For example, the skipped slice may be in layer 2 and the reference region used to reconstruct the skipped slice may be from layer 1. Layer 1 may be a reference layer for layer 2 and may have a higher priority than layer 0. To allow the reference region to be inferred during decoding, the start address for the reference region may be inserted in a slice header. The end address for the reference region may or may not be inserted in the slice header. When the end address for the reference region is not inserted in the slice header, the end address may still be identified by the decoder. The end address may be identified by using a decoder that may parse the next slice header and may infer the end address of the current slice from the start address of the next slice. As another example, the address at which a skipped slice ends may be signaled in the current slice header, which may minimize decoding latency. As another example, a number of skipped coding tree blocks (CTB) may be used to indicate the slice end address and may be signaled. At 524, the decoding of the slice from the bit stream may end.

Figure 6:
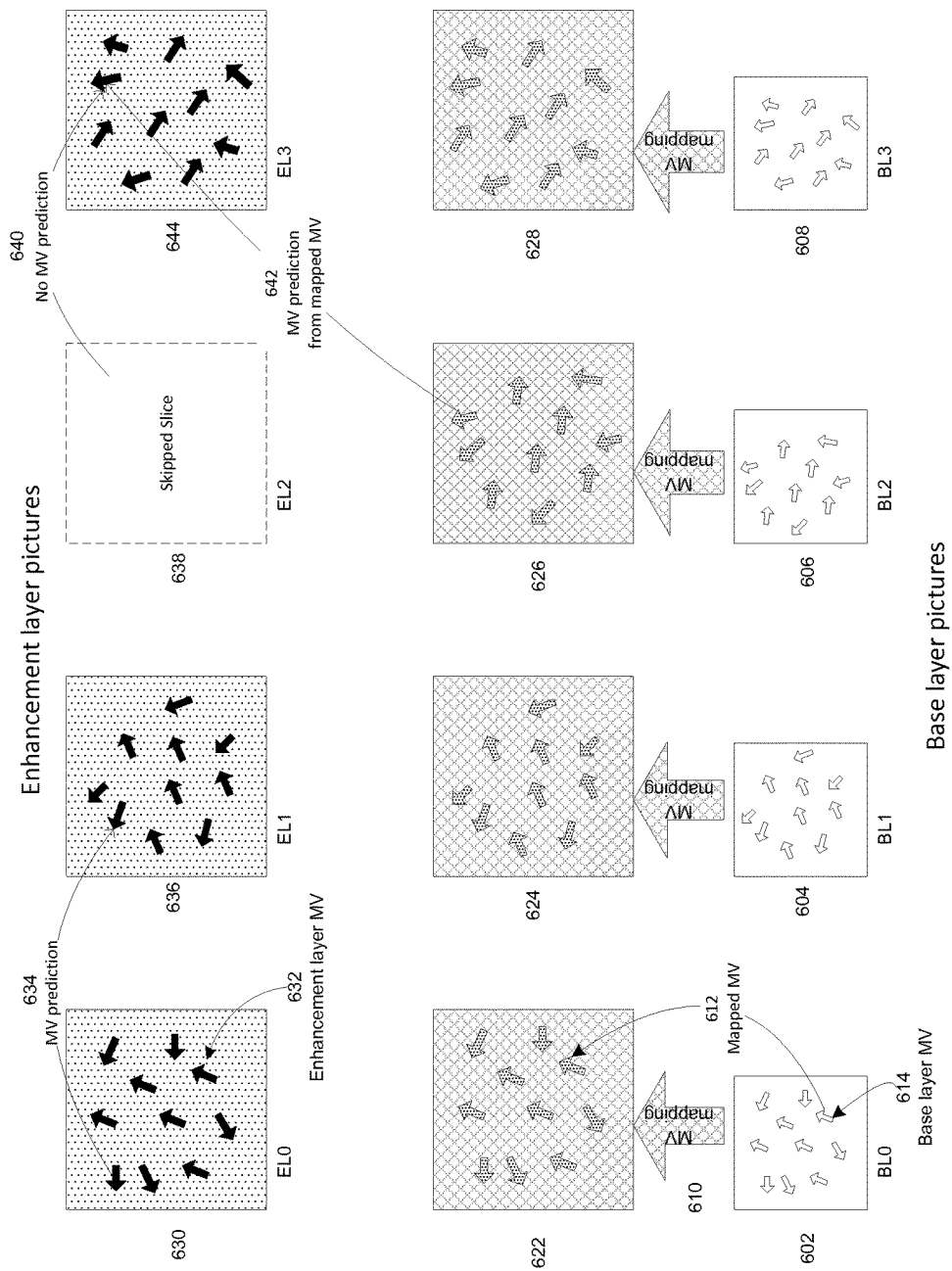
FIG. 6 depicts an example method of motion prediction using inter-layer mapped motion vector (MV) for a skipped slice.

FIG. 6 depicts an example method of motion prediction from inter-layer mapped motion vector (MV) for a skipped slice. Temporal motion vector prediction (TMVP) technology may be used to predict a motion vector (MV) of a current picture from the MVs of the previously coded pictures. This may be done, for example, to achieve efficient video compression. TMVP may be used in single layer HEVC. Because a skip slice may not transmit any coding data, such as block reference indexes and MVs, to the decoder, the following slice may not be able to use MV prediction if the skipped slice may be its co-located picture. This may cause coding efficiency degradation.

To avoid such coding efficiency degradation when using skip slice mode, inter-layer motion information mapping technology may be applied to the skipped slice. Inter-layer motion mapping technology may be used to prepare the motion information, which may include reference indexes and MVs, for a processed inter-layer reference picture. Prepared motion information may then be used to enable temporal motion vector prediction when the co-located reference picture may be an inter-layer reference picture. In the case of an enhancement layer skipped slice, the motion information may be mapped from the base layer pictures and may be used as the motion field of the skipped slice. The motion information may include reference indexes and MVs. The prepared motion information of a skipped slice may be used as temporal motion vector predictors when the skipped slice may be used as the co-located picture of another enhancement slice. FIG. 6 depicts an example of such a method.

Referring to FIG. 6, spatial scalability may be enabled between the base and the enhancement layer. Base layer pictures (BL0, BL1, BL2, and BL3) may have MVs, which may be further up-sampled to inter-layer mapped MVs. For example, a base layer picture, such as BL0 at 602, BL1 at 604, BL2 at 606, and BL3 at 608 may include motion vectors. For an enhancement layer picture, such as EL0 at 630, EL1 at 636, EL2 at 638, and EL3 at 644, motion vectors may be predicted from the previous coded picture MVs within the same layer. For example, at 634, the MVs for EL1 at 636 may be predicted from the MVs at 632 for EL0 at 630. EL2 at 638 may be a skipped slice. At 640, the MV for EL3 at 644 may not be predicted from the MV for EL2 at 638, as the MV for EL2 may not be available. At 642, the MV for EL3 at 644 may be predicted from an up-sampled inter-layer mapped MVs at 626. The up-sampled interlayer mapped MVs at 626 may be up-sampled from the MVs for the base layer picture BL2 at 606. For example, BL0 at 602 may be up-sampled such that the base layer MV at 614 may be mapped at 610 using MV mapping to produce the mapped MV 612 within up-sampled inter-layer picture 622. This may be done, for example, to preserve a gain achieved by temporal motion vector prediction when skipped slice may be used at the enhancement layer. Temporal motion vector prediction may also use reference indexes from a co-located picture, and may also use inter-layer mapped motion information that may include reference indexes mapped from the base layer.

An ILR picture may be up-sampled from a reconstructed picture of a reference layer in spatial scalability to, for example, improve the prediction accuracy. A hybrid-ILR (HILR) picture may be formed from a mapped motion field from a reference layer and a texture of an enhancement layer's temporal reference pictures. For example, an HILR may be created using texture information from EL and motion information from BL. The hybrid inter layer reference pictures may provide better scalable coding efficiency when used to predict the EL video. The EL texture information may not be subject to the same limitations as the BL texture information.

The mapped motion field may be described, for example, in units of 16×16 blocks. A 16×16 block of the mapped motion field of ILR(t) may have the same motion information. The mapped motion field may be derived from the compressed motion field of the BL picture BL(t). It may be assumed that the same constraints may be applied to the mapped motion field used to generate the hybrid ILR pictures. Other mapped motion fields, for example, motion fields with neither or one of the constraints described herein may be used to generate the hybrid ILR.

The mapped motion field may include one or more of the following motion information, for example, assuming that a 16×16 block located at (bx, by) may be denoted as $B^{MF}$(bx, by). A flag indicating whether the prediction of $B^{MF}$(bx, by) may be derived from a reference picture list L0 or a reference picture list L1, denoted as: PredFlagLx($B^{MF}$(bx, by)), Lx=L0, L1. The motion vectors of the L0, L1, or L0/L1 prediction, denoted as MVLx($B^{MF}$(bx, by)), Lx=L0, L1. And the reference picture indices of the L0, L1 or L0/L1 prediction, denoted as: RefIdxLx($B^{MF}$(bx, by)), Lx=L0, L1. If PredFlagLx($B^{MF}$(bx, by))=0, Lx=L0 or L1, the value of the corresponding RefIdxLx($B^{MF}$(bx, by)), Lx=L0, L1 may set as invalid.

Assuming that a 16×16 block in the hybrid ILR picture located at (bx, by) may be denoted as $B^{H-ILR}$(bx, by), the block $B^{H-ILR}$(bx, by) may be obtained by applying motion compensated prediction using the corresponding mapped motion information of $B^{MF}$(bx, by) and the EL temporal reference pictures. The hybrid ILR picture located $B^{H-ILR}$(bx, by) may be predicted using uni-prediction as provided by the equation (3), for example, when one of PredFlagL0($B^{MF}$(bx, by)) and/or PredFlagL1($B^{MF}$(bx, by)) may be equal to 1:

$$B^{H-ILR}(bx,by)=Ref^{EL}(bx+mvx,by+mvy) \quad (3)$$

For example, PredFlagL0($B^{MF}$(bx, by))=1 and/or PredFlagL1($B^{MF}$(bx, by))=0, mvx and mvy may be the horizontal and vertical components of MVL0($B^{MF}$(bx, by)) respectively. $Ref^{EL}$ may be the EL reference picture that may satisfy the condition in equation (4). The Picture Order Count (POC, or equivalently the time instance) of $Ref^{EL}$ may be the same as the POC of the BL reference picture indicated by RefIdxL0($B^{MF}$(bx, by)).

$$POC(Ref^{EL})=POC(Ref^{BL}(RefIdxLx(B^{MF}(bx,by)))) \quad (4)$$

$B^{H-ILR}$(bx, by) may be predicted using bi-prediction as provided by the equation (5), for example, when PredFlagL0($B^{MF}$(bx, by))=1, and/or PredFlagL1($B^{MF}$(bx, by))=1:

$$B^{H-ILR}(bx,by)=(Ref_0^{EL}(bx+mvx_0,by+mvy_0)+Ref_1^{EL}(bx+mvx_1,by+mby_1))/2 \quad (5)$$

where $mvx_0$ and $mvy_0$ may be the horizontal and vertical components of MVL0($B^{MF}$(bx, by)), and $mvx_1$ and $mvy_1$ may be the horizontal and vertical components of MVL1($B^{MF}$(bx, by)). $Ref_0^{EL}$ and $Ref_1^{EL}$ may be the EL reference pictures that may satisfy the conditions in equations (6) and (7).

$$POC(Ref_0^{EL})=POC(Ref^{BL}(RefIdxL0(B^{MF}(bx,by)))) \quad (6)$$

$$POC(Ref_1^{EL})=POC(Ref^{BL}(RefIdxL1(B^{MF}(bx,by)))) \quad (7)$$

The corresponding 16×16 block may be considered to be intra predicted, for example, when the PredFlagL0($B^{MF}$(bx, by))=0, and PredFlagL1($B^{MF}$(bx, by))=0. The $B^{H-ILR}$ (bx, by) may be obtained with the equation (8):

$$B^{H-ILR}(bx,by)=B^{ILR}(bx,by) \quad (8)$$

where $B^{ILR}$(bx, by) may be the up-sampled (e.g., if spatial ratio is >1) reconstructed base layer block.

The interpolation filters may be used to obtain the pixel values at the fractional pixel positions, for example, when the component of motion vector MVLx($B^{MF}$(bx, by)), Lx=L0, L1, has fractional pixel precision. The interpolation filters may be the same as those used in the temporal prediction process of the single layer encoder/decoder in the FIGS. 5 and 6. For example, the same 8-tap luma interpolation filters and 4-tap chroma interpolation filters as in HEVC may be used. Other interpolation filters may be used to reduce complexity and/or to improve performance of the motion compensated prediction during inter layer processing. For example, interpolation filters with shorter filter taps may be used. A loop filter, such as deblocking filter, may be used to improve the quality of the motion compensated prediction during inter layer processing.

Figure 7:
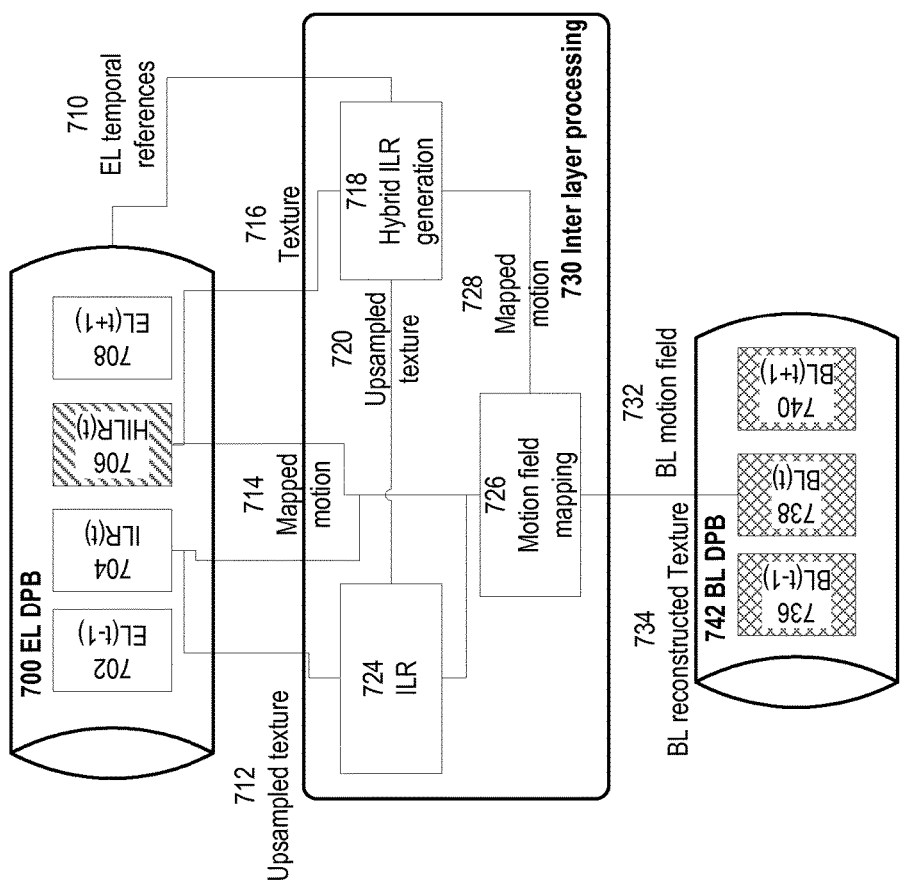
FIG. 7 depicts an inter-layer processing unit.

FIG. 7 depicts an inter-layer processing unit, which may be a processor. For example, FIG. 7 may show an inter-layer processing unit that may process ILR and HILR. The HILR may provide better inter-layer prediction accuracy than ILR such as, for example, when the reference layer is heavily quantified in SNR scalability. The skipped slice approach disclosed herein may infer a slice in the enhancement layer from a corresponding region of an ILR picture or an HILR picture.

Skip slice signaling may be designed to infer a skipped slice from an ILR picture from a reference layer. Signaling may be used when a skipped slice may be formed or predicted from more than one co-located ILR picture of multiple reference layers, or from non-collated ILR picture(s) of at least one reference layer. Signaling may also be used to identify which reference picture a skipped slice may be inferred from when an ILR or an HILR picture may be a candidate for a skip slice.

A flag, such as scalable_skipped_slice_pred_type, may be used in a skipped slice header to indicate which inter-layer reference picture may be used to predict the skipped slice. The reference picture may be an ILR, an HILR, or the like. The flag may be signaled when a hybrid sample prediction may be enabled for that slice. When the flag may not be presented, the default value may indicate that an ILR may be used to predict the skipped slice. The flag may be added into sequence parameter set (SPS) or picture parameter set (PPS), for example, to identify which ILR picture or HILR picture the skipped slice referring to the active SPS or PPS may be inferred from.

As shown in FIG. 7, inter-layer processing unit 730 may include a number of modules such as ILR 724, motion field mapping 726, and hybrid ILR generation 718. ILR 724 may send up-sampled texture information to and/or may receive up-sampled texture information 720 from enhancement layer (EL) decoded picture buffer (DPB) 700, hybrid ILR generation 718, and motion field mapping 726. Motion field mapping 726 may send mapped motion 728 to and/or may receive mapped motion 728 from hybrid ILR generation 718. Motion field mapping 728 may send mapped motion 714 to and/or may receive mapped motion 724 from EL DPB 700. Motion field mapping 728 may send mapped motion to and/or may receive mapped motion from ILR 724. Motion field mapping 728 may send BL reconstructed texture 734 and BL motion field 732 to BL DPB 742. Motion field mapping 728 may receive BL reconstructed texture 734 and BL motion field 732 from BL DPB 742. Hybrid ILR generation 718 may send texture 716 and/or EL temporal reference 710 to EL DPB 700. Hybrid ILR generation 718 may receive texture 716 and/or EL temporal reference 710 from EL DPB 700.

Inter-layer processing unit 730 may be operatively connected to EL DPB 700. For example, inter-layer processing unit 730 may send and/or receive information from EL DPB 700 that may include up-sampled texture 712, mapped motion 714, texture 716, and EL temporal reference 710. EL DPB may include EL(t−1) at 702, ILR(t) at 704, HILR(t) at 706, and EL(t+1) at 708. ILR(t) at 704 may include upsampled texture 712 and mapped motion 714. HILR(t) at 706 may include mapped motion 714 and texture 716.

Inter-layer processing unit 730 may be operatively connected to a base layer (BL) DPB. For example, inter-layer processing unit 730 may send and/or receive information from BL DPB 742 that may include BL(t−1) at 736, BL(t) at 738, and BL(t+1) at 740. BL DPB 742 may receive and/or send BL reconstructed texture at 734 and BL motion field at 732.

Figure 8:
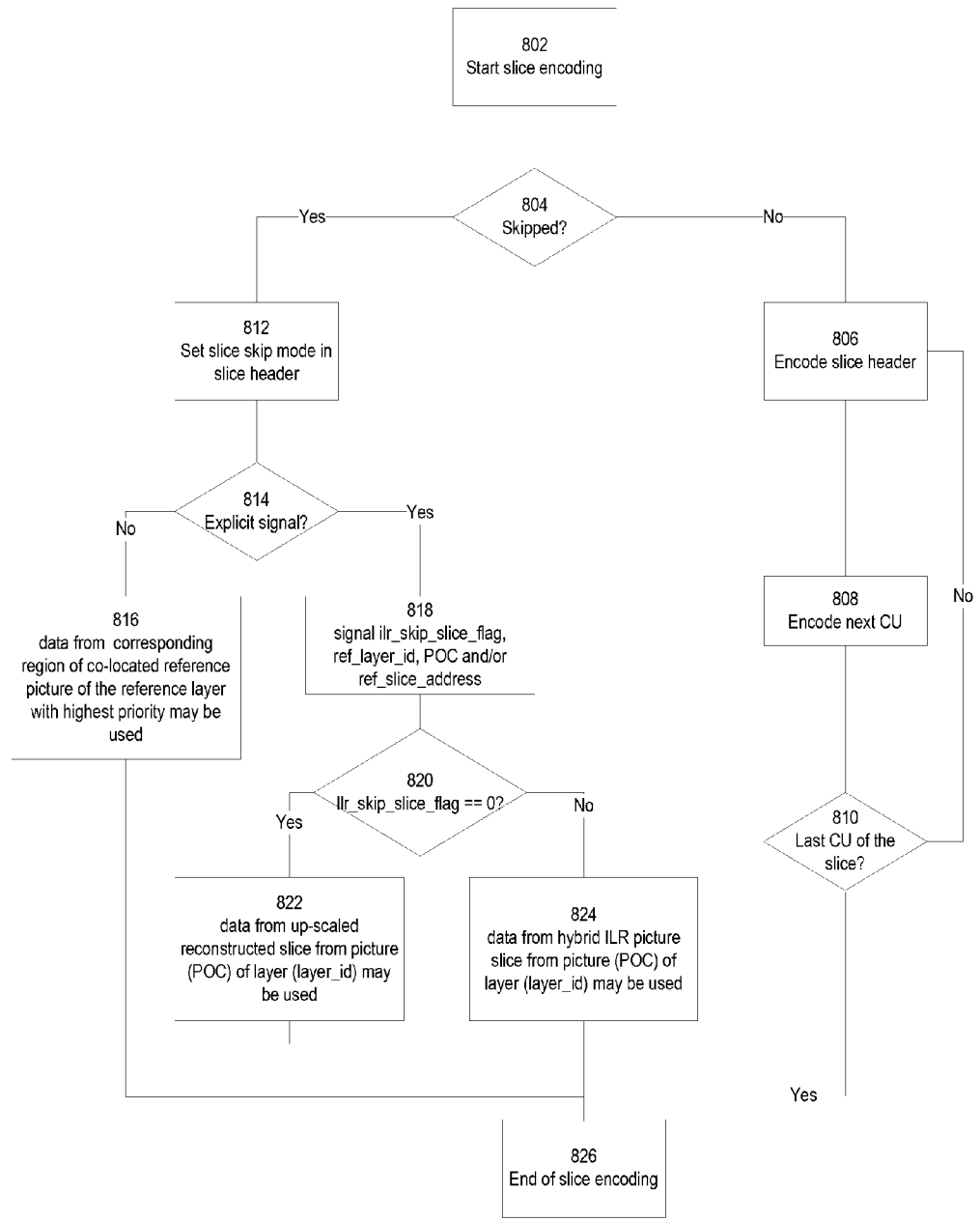
FIG. 8 depicts an example method for slice encoding using an inter-layer reference (ILR) picture and/or a hybrid ILR picture.

FIG. 8 depicts an example method for slice encoding using an inter-layer reference (ILR) picture and/or a hybrid ILR picture. For example, ILR skip slice flag, a reference layer index, a POC value, and a reference slice address may be inserted into a slice header to indicate the location of the reference region that may be used to reconstruct the skipped slice. The skipped slice may be a portion of a picture that may be skipped, a picture that may be skipped, or the like.

At 802, the encoding of a slice into a bit stream may start. The bit stream may be enhancement layer bit stream 230 shown with respect to FIG. 2. Referring again to FIG. 8, at 804 it may be determined whether a slice of a picture may be skipped. This may be done, for example, by analyzing a reference region of a reference picture to determine if the reference region may be used to reconstruct the skipped slice during decoding. At 806, it may be determined that the slice may not be skipped and the slice header may be encoded. The slice header may be encoded in the bit stream and may be followed by a slice segment that may have slice data, such as a CU, that may be included or encoded in the bit stream. At 808, a CU may be encoded in the bit stream. At 810, a determination may be made as to whether the CU encoded at 808 may be the last CU to encode for the slice. If the CU may not be the last CU to encode, the next CU to encode may be identified and encoded into the bit stream at 808; the process may be repeated until the last CU for the slice may be encoded into the bit stream. If the CU may be the last CU to encode, then the encoding of the slice into the bit stream may end at 826.

At 812, it may be determined that the slice may be skipped and a slice skip mode made be set in a slice header. The slice skip mode may indicate that the slice may be skipped. At 814, it may be determined whether explicit or implicit signaling may be used to indicate that the slice may be skipped.

At 818, a skip slice header may be encoded in the bit stream when explicit signaling may be used to indicate that the slice may be skipped For example, an explicit signal, such as the skip slice header, may indicate an ILR skip slice flag, a reference layer, a reference picture, and a reference region to be used from the reference picture to reconstruct the skipped slice. For example, the reference region may be used to create the skipped slice. The ILR skip slice flag may indicate whether an ILR or a HILR may be used to reconstruct the skipped slice. For example, the flag may indicate that the reference picture may be an ILR or a HILR. The skip slice header may include information used to indicate a location of a reference region of a reference picture that may be used to predict or create the skipped slice. For example, the information in the skip slice header may include an ILR skip slice flag; a reference layer index; an identity of a reference picture, such as a picture order count (POC) value or the distance between a current picture and the reference picture; and/or the start and end address of the reference region, such as a CTB address or pixel position; or the like. As another example, the information in the skip slice header may include an ILR skip slice flag, a reference layer index, a reference picture identity, a start address of the reference region, a total number of coding tree blocks (CTB), or the like. As another example, the information in the skip slice header may include an ILR skip slice flag; a reference layer index; a reference picture identity; relative information, such as motion or disparity information; or the like. The motion information or disparity information may be applied on the slice region and may indicate the relative movement (in X and Y dimension) between the skipped slice and its reference region. As another example, where more than one reference region may be used to predict the skipped slice, the information in the skip slice header may include an ILR skip slice flag, a number of reference regions; reference layer IDs; reference picture POCs; relative information, such as motion vector of the reference regions; or the like. The slice header may be slice header 232 shown with respect to FIG. 2.

Referring again to FIG. 8, at 820, an ILR skip slice flag may be used to determine if an ILR or a HILR may be used. At 822, it may be determined that an ILR may be used and a reference region from a reference picture or may be used to form or predict a skipped slice. The reference picture may be an ILR. For example, a reference region from the ILR picture may be used to reconstruct the skipped slice. This may be done, for example, to allow encoding of the next slice to occur when the skipped slice may not be encoded in the bit stream. A position of the reference region in the ILR picture may be different from a position of the skipped slice.

The ILR picture may be indicated by the skipped slice header. For example, the skipped slice header may indicate that the ILR picture may be used to create or predict the skipped slice. As another example, the skipped slice header may indicate a reference region of the ILR picture that may be used to create or predict the skipped slice, which may be used to reconstruct the skipped slice.

The reference region may be used, for example, to encode additional slices. For example, a base layer picture may be up-sampled to create an ILR picture. The ILR picture may be processed via linear and/or non-linear inter-layer processing mechanisms to improve prediction accuracy. A slice from the ILR picture may be used to predict the skipped slice. For example, a slice from the ILR picture may be used for inter-layer prediction of an enhancement layer slice that may be the skipped slice. The slice from the ILR picture may be the reference region.

Because the skipped slice may not be encoded into the bit stream, the reference region that may be used to predict the skipped slice may be used to encode a next slice. At 826, the skipped slice header may be encoded into the bit stream while the reference region may not be encoded into the bit stream.

At 824, it may be determined that an HILR may be used and a reference region from the HILR may be identified. The HILR may be created as motion compensated reference picture by using texture information from the EL and motion information from the BL. The reference region from the HILR may be used to reconstruct the skipped slice. This may be done, for example, to allow encoding of the next slice to occur when the skipped slice may not be encoded in the bit stream. A position of the reference region in the HILR may be different from a position of the skipped slice. At 826, the skipped slice header may be encoded into the bit stream while the reference region may not be encoded into the bit stream.

At 816, data from a region of a reference picture may be used form or predict a skipped slice. The reference picture may be a co-located reference picture and may have the highest priority within a multi-layer video coding. A skipped slice may be formed or predicted from a reference region that may correspond to the skipped slice. The slice to be encoded may be part of a multi-layer video that may include, for example, layer 0, layer 1, and layer 2. Layer 2 may be an enhancement layer. Layer 1 may be another enhancement layer. Layer 0 may be a base layer. Layer 2 pictures may be predicted from layer 1 and/or layer 0 reference pictures. Layer 2 may have higher priority than layer 1, and layer 1 may have higher priority than layer 0. The reference region may be from a reference picture that may come from a reference layer with the highest priority. For example, the skipped slice may be in layer 2 and the reference region used to reconstruct the skipped slice may be from layer 1. Layer 1 may be a reference layer for layer 2 and may have a higher priority than layer 0. To allow the reference region to be inferred during decoding, the start address for the reference region may be inserted in a slice header. The end address for the reference region may or may not be inserted in the slice header. When the end address for the reference region is not inserted in the slice header, the end address may still be identified by the decoder. The end address may be identified by using a decoder that may parse the next slice header and may infer the end address of the current slice from the start address of the next slice. As another example, the address at which a skipped slice ends may be signaled in the current slice header, which may minimize decoding latency. As another example, a number of skipped coding tree blocks (CTB) may be used to indicate the slice end address and may be signaled. At 826, the slice header may be encoded into the bit stream.

Figure 9:
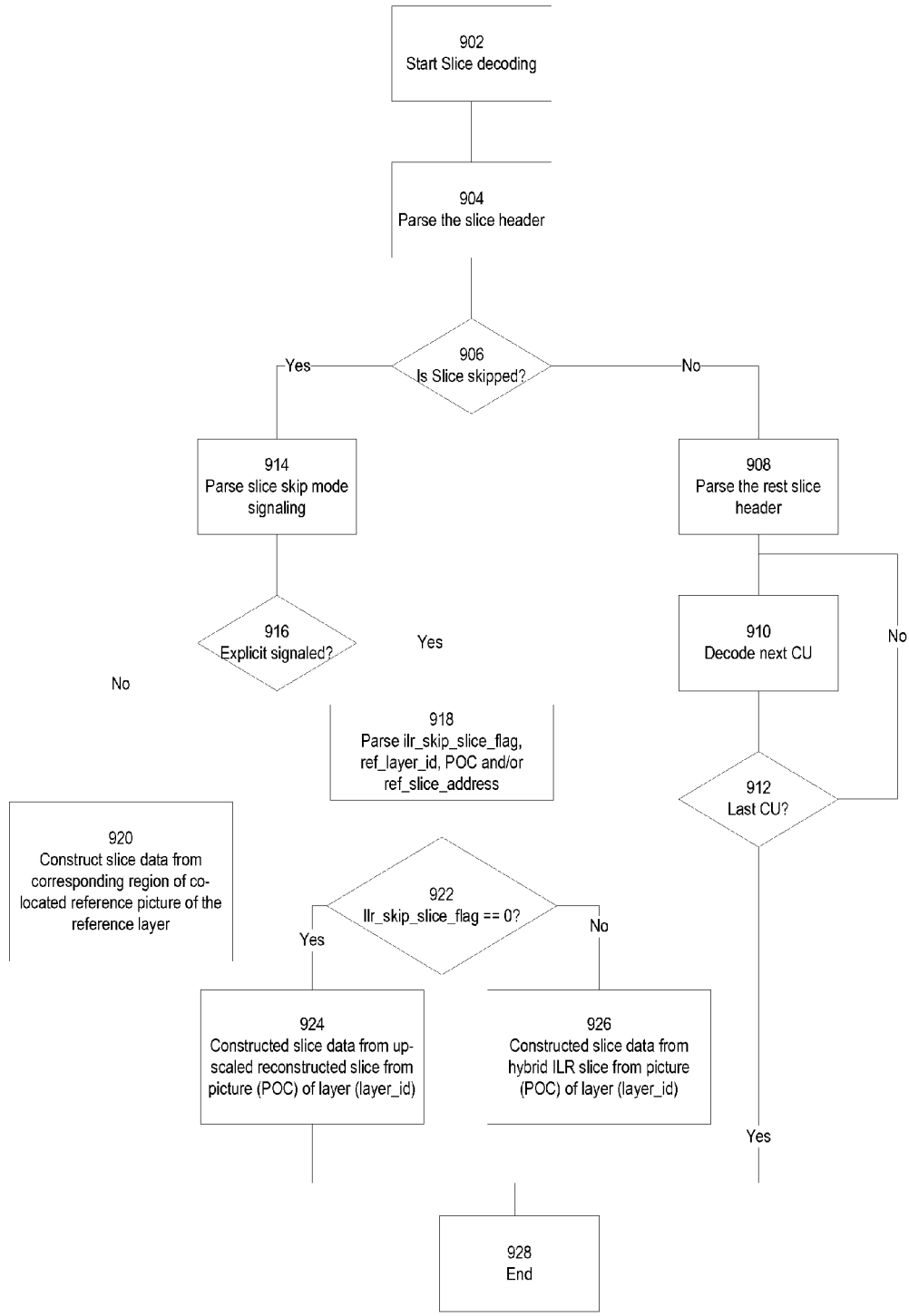
FIG. 9 depicts an example method for slice decoding using an inter-layer reference (ILR) picture and/or a hybrid ILR picture.

FIG. 9 depicts an example method for slice decoding using an inter-layer reference (ILR) picture and/or a hybrid ILR picture. For example, an ILR skip slice flag; a reference layer index; a reference picture; a POC value or a distance between the current picture and the reference picture; the start and end address of the reference region, in terms of CTB address or pixel position; or the like, may be read from a slice header to determine the location of the reference region. The skipped slice may be a portion of a picture that may be skipped, a picture that may be skipped, or the like.

At 902, the decoding of a slice from a bit stream may start. The bit stream may be enhancement layer bit stream 230 shown with respect to FIG. 2. Referring again to FIG. 9, at 904 a slice header may be parsed and a determination may be made at 906 as to whether the slice header indicates that the current slice may have been skipped. The slice header may be a skipped slice header.

At 908, the slice header may be parsed when the slice header may indicate that the current slice may not have been skipped. The slice header may indicate that slice data, such as a CU, that may be encoded in the bit stream. At 910, a CU may be decoded from the bit stream. At 912, a determination may be made as to whether the CU decoded at 908 may be the last CU to decode for the slice. If the CU may not be the last CU to decode, the next CU to decode may be identified and decoded from the bit stream at 910; the process may be repeated until the last CU for the slice may be decoded from the bit stream. If the CU may be the last CU to decode, then the decoding of the slice from the bit stream may end at 928.

At 914, the slice header may be parsed to determine slice skip mode signaling when it may have been determined that the current slice may have been skipped. At 916, the slice skip mode signaling from the slice header may be analyzed to determine whether the slice skip mode signaling may have been implicit or explicit.

At 918, it may be determined that explicit signaling may have been used to signal that the current slice may have been skipped. For example, a skip slice header may have been encoded in the bit stream to indicate that the slice may have been skipped. The skip slice header or slice header may indicate an ILR skip slice flag, a reference layer, a reference picture, and a reference region to be used from the reference picture to reconstruct the skipped slice. For example, the reference region may be used to reconstruct the skipped slice. The ILR skip slice flag may indicate whether an ILR or a HILR may be used to reconstruct the skipped slice. For example, the flag may indicate that the reference picture may be an ILR or a HILR. The skip slice header may include information used to indicate a location of a reference region of a reference picture that may be used to predict or create the skipped slice. For example, the information in the skip slice header may include an ILR skip slice flag; a reference layer index; an identity of a reference picture, such as a picture order count (POC) value or the distance between a current picture and the reference picture; and/or the start and end address of the reference region, such as a CTB address or pixel position; or the like. As another example, the information in the skip slice header may include an ILR skip slice flag, a reference layer index, a reference picture identity, a start address of the reference region, a total number of coding tree blocks (CTB), or the like. As another example, the information in the skip slice header may include a ILR skip slice flag; a reference layer index; a reference picture identity; relative information, such as motion or disparity information; or the like. The motion information or disparity information may be applied on the slice region and may indicate the relative movement (in X and Y dimension) between the skipped slice and its reference region. As another example, where more than one reference region may be used to predict the skipped slice, the information in the skip slice header may include an ILR skip slice flag, a number of reference regions; reference layer IDs; reference picture POCs; relative information, such as motion vector of the reference regions; or the like. The slice header may be slice header 232 shown with respect to FIG. 2.

Referring again to FIG. 9, at 922, an ILR skip slice flag may be used to determine if an ILR or a HILR may be used. At 924, it may be determined that an ILR picture may be used and the skipped slice may be reconstructed from using a reference region from the ILR picture. For example, a reference region from the ILR picture may be determined so that the reference region may be used to reconstruct the skipped slice. This may be done, for example, to allow the skipped slice to be reconstructed when skipped slice may not be encoded in the bit stream. The reference region may be taken from the ILR picture. A position of the reference region in the ILR picture may be different from a position of the skipped slice.

The ILR picture may be the ILR picture indicated by the skipped slice header. For example, the skipped slice header may indicate that the ILR picture may be used to create or predict the skipped slice. As another example, the skipped slice header may indicate a reference region of the ILR picture that may be used to create or predict the skipped slice, which may be used to reconstruct the skipped slice.

The reference region may be used to reconstruct the skipped slice. For example, a base layer picture may be up-sampled to create an ILR picture. The ILR picture may be processed via linear and/or non-linear inter-layer processing mechanisms to improve prediction accuracy. A slice from the ILR picture may be used to predict the skipped slice. For example, a slice from the ILR picture may be used for inter-layer prediction of an enhancement layer slice that may be the skipped slice. The slice from the ILR picture may be the reference region.

At 926, it may be determined that an HILR may be used and a reference region from the HILR may be identified. The HILR may be created using texture information from the EL and motion information from the BL. A reference region from the HILR may be identified so that the reference region may be used to reconstruct the skipped slice. This may be done, for example, to allow encoding of the next slice to occur when the skipped slice may not be encoded in the bit stream. A position of the reference region in the HILR may be different from a position of the skipped slice. At 928, the skipped slice header may be encoded into the bit stream while the reference region may not be encoded into the bit stream.

At 920, the skipped slice may be reconstructed from a reference region of a co-located reference picture when implicit signaling may be used. A skipped slice may be formed or predicted from a reference region that may correspond to the skipped slice. The slice to be decoded may be part of a multi-layer video that may include, for example, layer 0, layer 1, and layer 2. Layer 2 may be an enhancement layer. Layer 1 may be another enhancement layer. Layer 0 may be a base layer. Layer 2 pictures may be predicted from layer 1 and/or layer 0 reference pictures. Layer 2 may have higher priority than layer 1, and layer 1 may have higher priority than layer 0. The reference region may be from a reference picture that may come from a reference layer with the highest priority. For example, the skipped slice may be in layer 2 and the reference region used to reconstruct the skipped slice may be from layer 1. Layer 1 may be a reference layer for layer 2 and may have a higher priority than layer 0. To allow the reference region to be inferred during decoding, the start address for the reference region may be inserted in a slice header. The end address for the reference region may or may not be inserted in the slice header. When the end address for the reference region is not inserted in the slice header, the end address may still be identified by the decoder. The end address may be identified by using a decoder that may parse the next slice header and may infer the end address of the current slice from the start address of the next slice. As another example, the address at which a skipped slice ends may be signaled in the current slice header, which may minimize decoding latency. As another example, a number of skipped coding tree blocks (CTB) may be used to indicate the slice end address and may be signaled. At 422, the decoding of the slice from the bit stream may end.

Syntax for a slice segment header may be provided. For example, Table 1 illustrates slice segment header syntax that may be used.

TABLE 1

| slice_segment_header( ) { | Descriptor |
|---|---|
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     if( num_extra_slice_header_bits > 0 ) | |
|       discardable_flag | u(1) |
|     for( i = 1; i < num_extra_slice_header_bits ; i++ ) | |
|       slice_reserved_flag[ i ] | u(1) |
|     slice_type | ue(v) |
|     if( output_flag_present_flag ) | |
|       pic_output_flag | u(1) |
|     if( separate_colour_plane_flag == 1 ) | |
|       colour_plane_id | u(2) |
|     if( nal_unit_type != IDR_W_RADL && nal_unit_type != IDR_N_LP ) { | |
|       slice_pic_order_cnt_lsb | u(v) |
|       short_term_ref_pic_set_sps_flag | u(1) |
|       if( !short_term_ref_pic_set_sps_flag ) | |
|         short_term_ref_pic_set( num_short_term_ref_pic_sets ) | |
|       else if( num_short_term_ref_pic_sets > 1 ) | |
|         short_term_ref_pic_set_idx | u(v) |
|       if( long_term_ref_pics_present_flag ) { | |
|         if( num_long_term_ref_pics_sps > 0 ) | |
|           num_long_term_sps | ue(v) |
|         num_long_term_pics | ue(v) |
|         for( i = 0; i < num_long_term_sps + num_long_term_pics; i++ ) { | |
|           if( i < num_long_term_sps ) { | |
|             if( num_long_term_ref_pics_sps > 1 ) | |
|               lt_idx_sps[ i ] | u(v) |
|           } else { | |
|             poc_lsb_lt[ i ] | u(v) |
|             used_by_curr_pic_lt_flag[ i ] | u(1) |
|           } | |
|           delta_poc_msb_present_flag[ i ] | u(1) |
|           if( delta_poc_msb_present_flag[ i ] ) | |
|             delta_poc_msb_cycle_lt[ i ] | ue(v) |
|         } | |
|       } | |
|       if( sps_temporal_mvp_enabled_flag ) | |
|         slice_temporal_mvp_enabled_flag | u(1) |
|     } | |

TABLE 1-continued

| slice_segment_header( ) { | Descriptor |
|---|---|
|     if( sample_adaptive_offset_enabled_flag ) { | |
|         slice_sao_luma_flag | u(1) |
|         slice_sao_chroma_flag | u(1) |
|     } | |
|     if( slice_type = = P \|\| slice_type = = B ) { | |
|         num_ref_idx_active_override_flag | u(1) |
|         if( num_ref_idx_active_override_flag ) { | |
|             num_ref_idx_l0_active_minus1 | ue(v) |
|         if( slice_type = = B ) | |
|             num_ref_idx_l1_active_minus1 | ue(v) |
|     } | |
|     if( lists_modification_present_flag && NumPocTotalCurr > 1 ) | |
|         ref_pic_lists_modification( ) | |
|     if( slice_type = = B ) | |
|         mvd_l1_zero_flag | u(1) |
|     if( cabac_init_present_flag ) | |
|         cabac_init_flag | u(1) |
|     if( slice_temporal_mvp_enabled_flag ) { | |
|         AltCollocatedIndicationFlag = 0 | |
|         if( nuh_layer_id > 0 && NumMotionPredRefLayers[ nuh_layer_id ] > 0 ) { | |
|             alt_collocated_indication_flag | u(1) |
|             AltCollocatedIndicationFlag = alt_collocated_indication_flag | |
|         } | |
|         if( AltCollocatedIndicationFlag ) | |
|             if( NumMotionPredRefLayers[ nuh_layer_id ] > 1 ) | |
|                 collocated_ref_layer_idx | ue(v) |
|         else { | |
|             if( slice_type = = B ) | |
|                 collocated_from_l0_flag | u(1) |
|             if( ( collocated_from_l0_flag && num_ref_idx_l0_active_minus1 > 0 ) \|\| | |
|                 ( !collocated_froma_l0_flag && num_ref_idx_l1_active_minus1 > 0 ) ) | |
|                 collocated_ref_idx | ue(v) |
|         } | |
|     } | |
|     if( ( weighted_pred_flag && slice_type = = P ) \|\| | |
|       ( weighted_bipred_flag && slice_type = = B ) ) | |
|         pred_weight_table( ) | |
|     five_minus_max_num_merge_cand | ue(v) |
| } | |
| slice_qp_delta | se(v) |
| if( pps_slice_chroma_qp_offsets_present_flag ) { | |
|     slice_cb_qp_offset | se(v) |
|     slice_cr_qp_offset | se(v) |
| } | |
| if( deblocking_filter_override_enabled_flag ) | |
|     deblocking_filter_override_flag | u(1) |
| if( deblocking_filter_override_flag ) { | |
|     slice_deblocking_filter_disabled_flag | u(1) |
|     if( !slice_deblocking_filter_disabled_flag ) { | |
|         slice_beta_offset_div2 | se(v) |
|         slice_tc_offset_div2 | se(v) |
|     } | |
| } | |
|     if( pps_loop_filter_across_slices_enabled_flag && | |
|       ( slice_sao_luma_flag \|\| slice_sao_chroma_flag \|\| | |
|       !slice_deblocking_filter_disabled_flag ) ) | |
|         slice_loop_filter_across_slices_enabled_flag | u(1) |
| } | |
| if( tiles_enabled_flag \|\| entropy_coding_sync_enabled_flag ) { | |
|     num_entry_point_offsets | ue(v) |
|     if( num_entry_point_offsets > 0 ) { | |
|         offset_len_minus1 | ue(v) |
|         for( i = 0; i < num_entry_point_offsets; i++ ) | |
|             entry_point_offset_minus1[ i ] | u(v) |
|     } | |
| } | |
| if( nuh_layer_id > 0 && NumDirectRefLayers[ nuh_layer_id ] > 0 ) { | |
|     inter_layer_pred_enabled_flag | u(1) |
|     if( inter_layer_pred_enabled_flag && NumDirectRefLayers[ nuh_layer_id ] > 1) { | |
|         if( !max_one_active_ref_layer_flag ) { | |
|             num_inter_layer_ref_pics_minus1 | u(v) |
|             NumActiveRefLayerPics = num_inter_layer_ref_pics_minus1 + 1 | |
|         } else | |
|             NumActiveRefLayerPics = 1 | |
|         for( i = 0; i < NumActiveRefLayerPics; i++ ) | |
|             inter_layer_pred_layer_idc[ i ] | u(v) |
|     } else | |
|         NumActiveRefLayerPics = inter_layer_pred_enabled_flag ? 1 : 0 | |

TABLE 1-continued

| slice_segment_header( ) { | Descriptor |
|---|---|
| } else | |
|   NumActiveRefLayerPics = 0 | |
| if( NumSamplePredRefLayers[ nuh_layer_id ] > 0 && NumActiveRefLayerPics > 0 ) | |
|   inter_layer_sample_pred_only_flag | u(1) |
| if( nuh_layer_id > 0 && NumActiveRefLayerPics > 0) { | |
|   scalable_slice_skip_flag | u(1) |
|   if( scalable_slice_skip_flag ) { | |
|     picture_skip_flag | u(1) |
|     if (picture_skip_flag == 0) { | |
|       num_ctus_in_skipped_slice | u(v) |
|     } | |
|     if (NumActiveRefLayerPics > 1) | |
|       scalable_skipped_slice_ref_layer_idx | ue(v) |
|     SkippedSlicePredType = (nal_unit_type == IDR_W_RADL \|\| nal_unit_type == IDR_N_LP) ? 0 : (direct_dependency_type[nuh_layer_id][skip_slice_ref_layer_idx]) | |
|     if( (nal_unit_type!= IDR_W_RADL && nal_unit_type != IDR_N_LP) && (direct_dependency_type[nuh_layer_id][skip_slice_ref_layer_idx] == 2)) { | |
|       scalable_skipped_slice_pred_type | u(1) |
|       SkippedSlicePredType = scalable_skipped_slice_pred_type | |
|     } | |
|   } | |
| } | |
| if( slice_segment_header_extension_present_flag ) { | |
|   slice_segment_header_extension_length | ue(v) |
|   for( i = 0; i < slice_segment_header_extension_length; i++) | |
|     slice_segment_header_extension_data_byte[ i ] | u(8) |
| } | |
| byte_alignment( ) | |
| } | |

Slice segment layer RBSP syntax may be provided. For example, Table 2 illustrates slice segment layer RBSP syntax.

TABLE 2

| slice_segment_layer_rbsp( ) { | Descriptor |
|---|---|
|   slice_segment_header( ) | |
|   if (!scalable_slice_skip_flag) | |
|     slice_segment_data( ) | |
|   rbsp_slice_segment_trailing_bits( ) | |
| } | |

Slice segment header semantics may be provided. For example, a scalable_slice_skip_flag equal to 1 may indicate that slice_segment_data( ) may not be present for the current slice. scalable_slice_skip_flag equal to 0 may indicate that slice_segment_data( ) may be present for the current slice. When scalable_skip_slice_flag may not be present, it may be inferred to be equal to 0.

A picture_skip_flag equal to 1 may indicate that the picture may be skipped. picture_skip_flag equal to 0 may indicate that a number of coding tree units may be skipped. When picture_skip_flag may not be present, it may be inferred to be equal to 0.

num_ctus_in_skipped_slice may indicate the number of coding tree units for slice with scalable_skip_slice_flag equal to 1. The number of bits used to represent num_ctus_in_skipped_slice may be Ceil(Log2(PicWidthInCtbsY*PicHeightInCtbsY)).

scalable_skipped_slice_ref_layer_idx may indicate the co-located picture for skipped slice prediction. When not present, the value of scalable_skipped_slice_ref_layer_idx may be inferred to be equal to 0. The value of scalable_skipped_slice_ref_layer_idx may be in the range of 0 to NumDirectRefLayers[nuh_layer_id]−1, inclusive.

scalable_skipped_slice_pred_type equal to 0 may indicate that the skipped slice may be predicted from the inter-layer reference picture (ILR). The value of scalable_skipped_slice_pred_type equal to 1 may indicate that the skipped slice may be predicted from the hybrid inter-layer reference picture (HILR). When scalable_skipped_slice_pred_type may not be present, it may be equal to 0.

A decoding process for a coded picture may be provided. For example, the decoding process may be used for a coded picture with nuh_layer_id greater than 0. Bit stream conformance may request that the coded slices with scalable_slice_skip_flag equal to 0 of the picture may contain slice segement data for a coding stree unit of the picture, such that a division of the picture into slices, a division of the slices into slice segments, and a division of the slice segments into a coding tree unit form a partioning of the picture.

A decoding process for a skipped slice with nuh_layer_id greater than 0 may be provide. This process may be invoked once per slice. For example, this process may be invoked after decoding a slice header and reference picture lists construction, but prior to the decoding of a coding unit.

When SkippedSlicePredType may be equal to 0, a sub-function may be invoked to generate a resampled reference layer picture, which may be referred to as rsPic. The output of this process may be the predicted skipped slice, which may be referred to as psSlice, and it may be set to the corresponding num_ctus_in_skipped_slice of coding tree blocks of rsPic.

When SkippedSlicePredType is equal to 1, a decoding process may be invoked to generate a hybrid inter-layer reference picture (HILR). The output of this process, which may be referred to as psSlice, may be set to the corresponding num_ctus_in_skipped_slice of coding tree blocks of HILR picture. The decoding process of deblocking and/or other loop filters may be applied to hybrid inter-layer reference picture (HILR) or ILR picture.

When inter-layer motion prediction may be allowed for the slice, the resampling process of picture motion field may be invoked to generate the mapping motion information of a skipped slice for the temporal motion vector prediction of the following pictures.

Figure 10A:
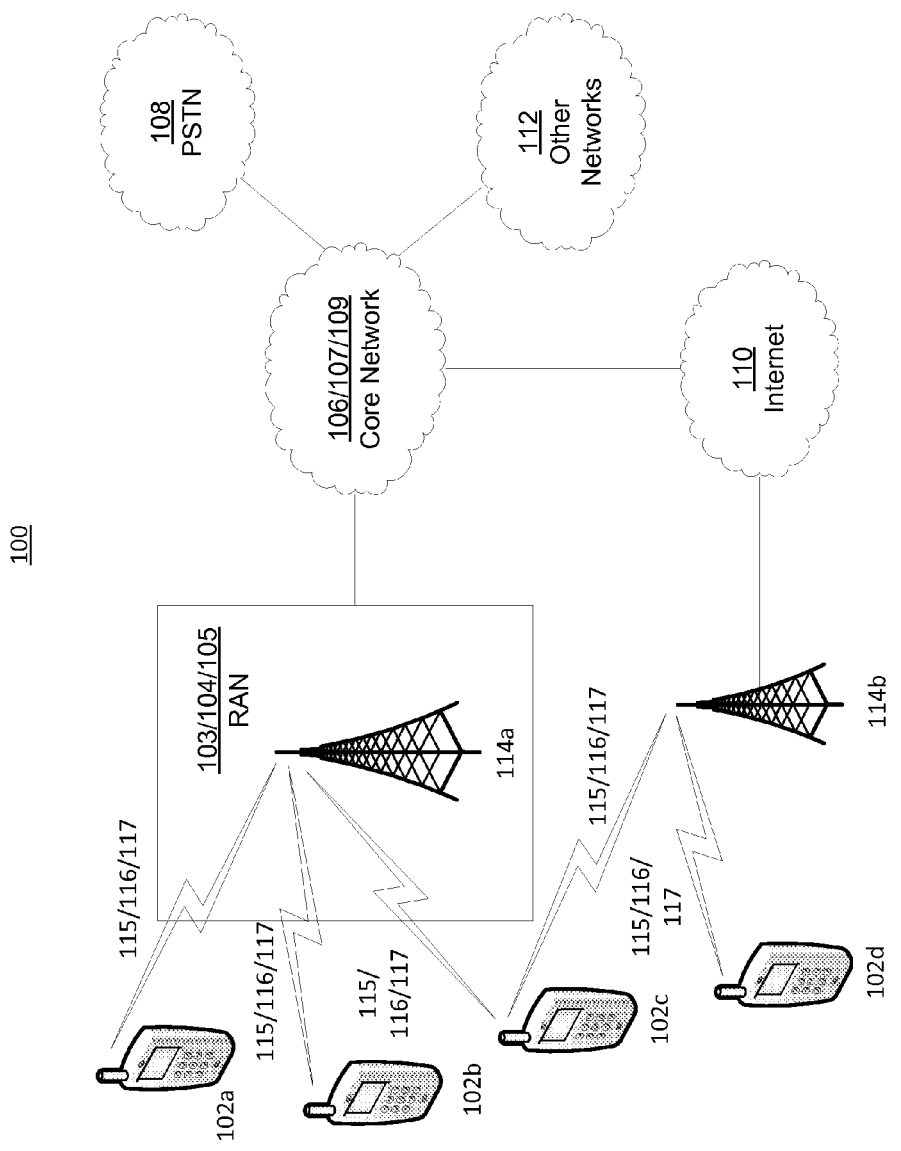
FIG. 10A depicts a system diagram of an example communications system in which one or more disclosed embodiments may be implemented.

FIG. 10A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 10A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 10A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 10A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 10A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 10A may be configured to communicate with the base station 114a, which may employ a cellular-based radio technology, and with the base station 114b, which may employ an IEEE 802 radio technology.

Figure 10B:
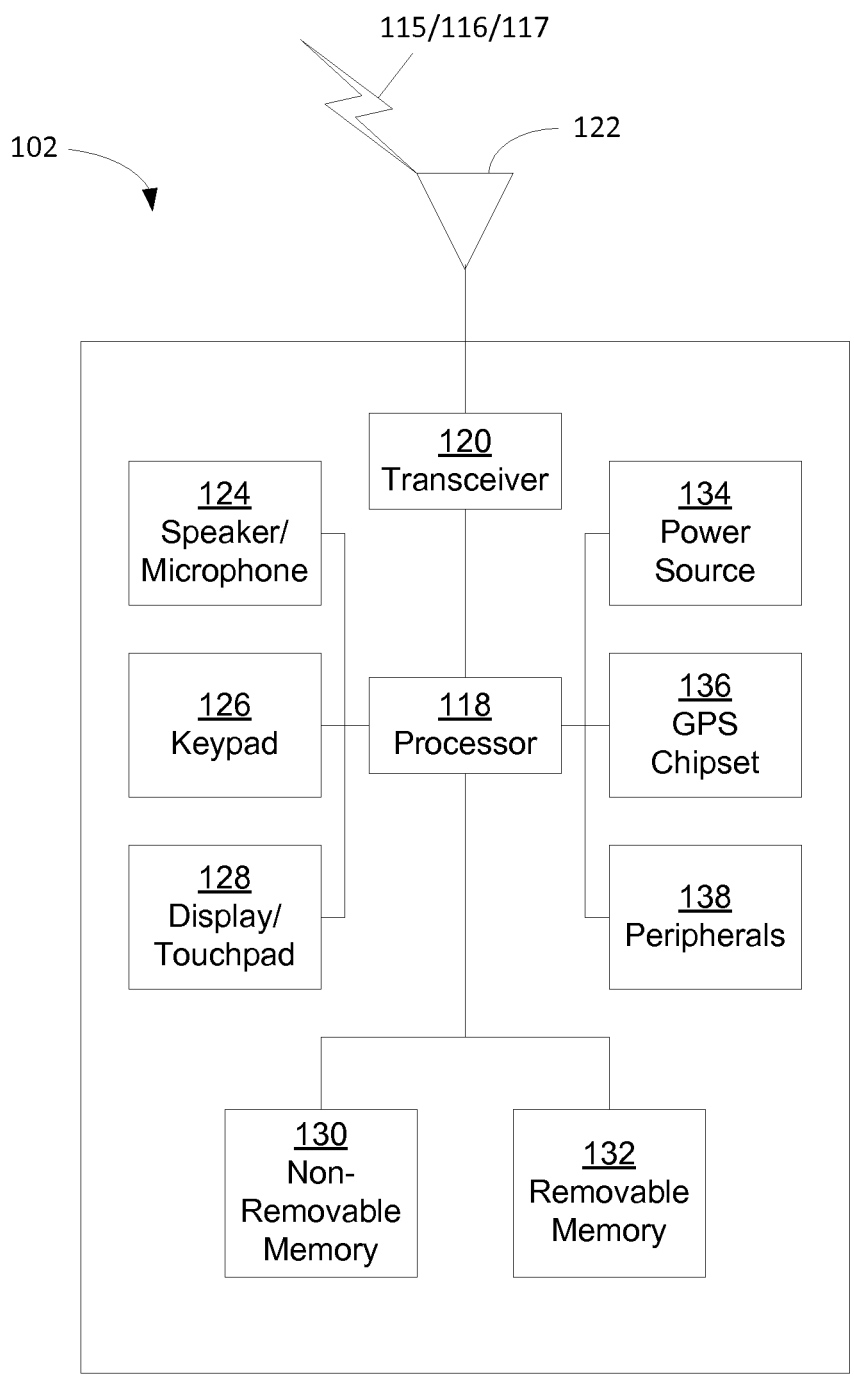
FIG. 10B depicts a system diagram of an example wireless transmit/receive unit (WTRU) that may be used within the communications system illustrated in FIG. 10A.

FIG. 10B is a system diagram of an example WTRU 102. As shown in FIG. 10B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 10B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 10B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 10B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10C:
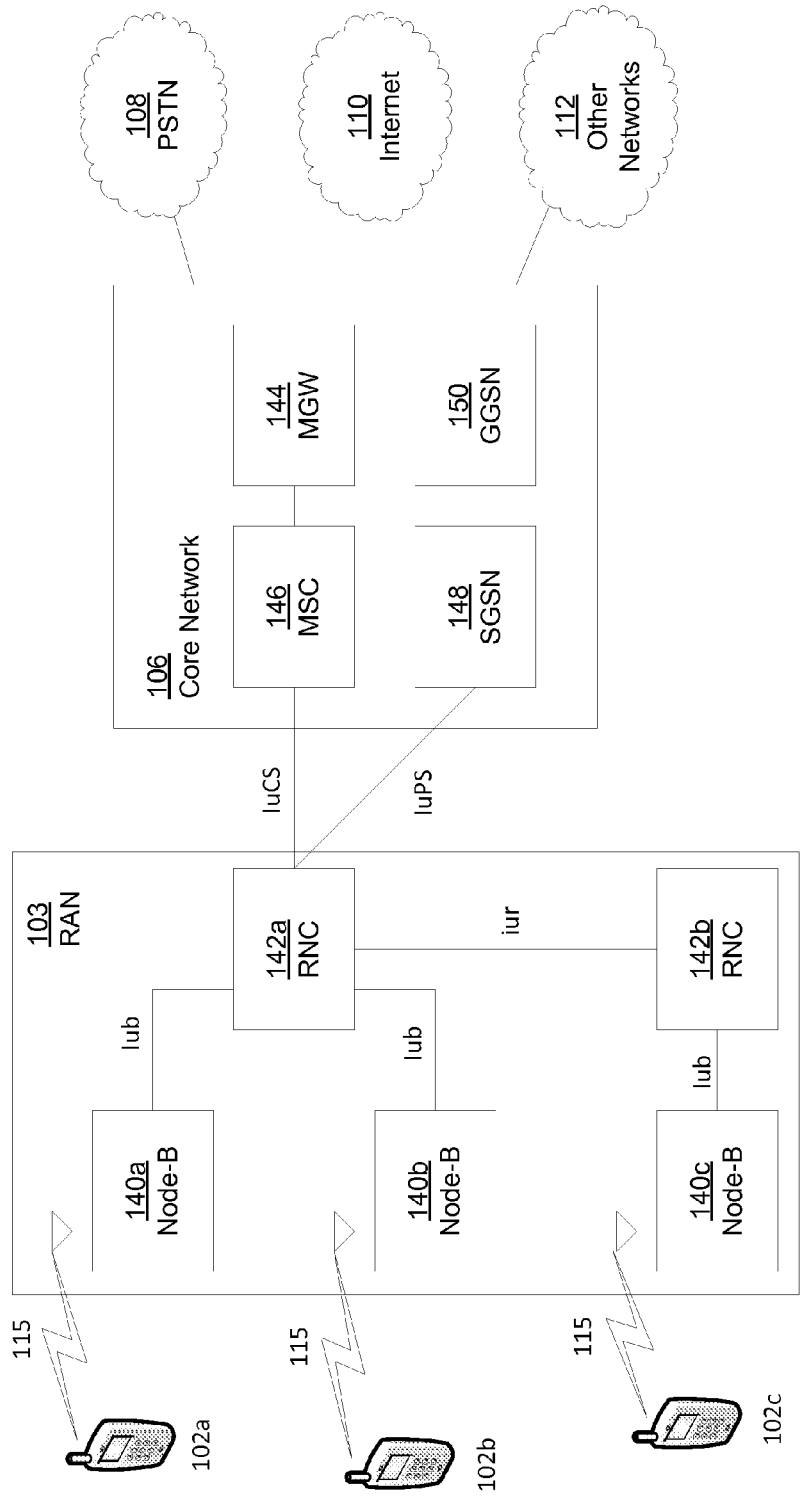
FIG. 10C depicts a system diagram of an example radio access network and an example core network that may be used within the communications system illustrated in FIG. 10A.

FIG. 10C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 10C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 10C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 10C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between the WTRUs 102a, 102b, 102c and IP-enabled devices.

As noted above, the core network 106 may also be connected to the networks 112, which may include other wired or wireless networks that are owned and/or operated by other service providers.

Figure 10D:
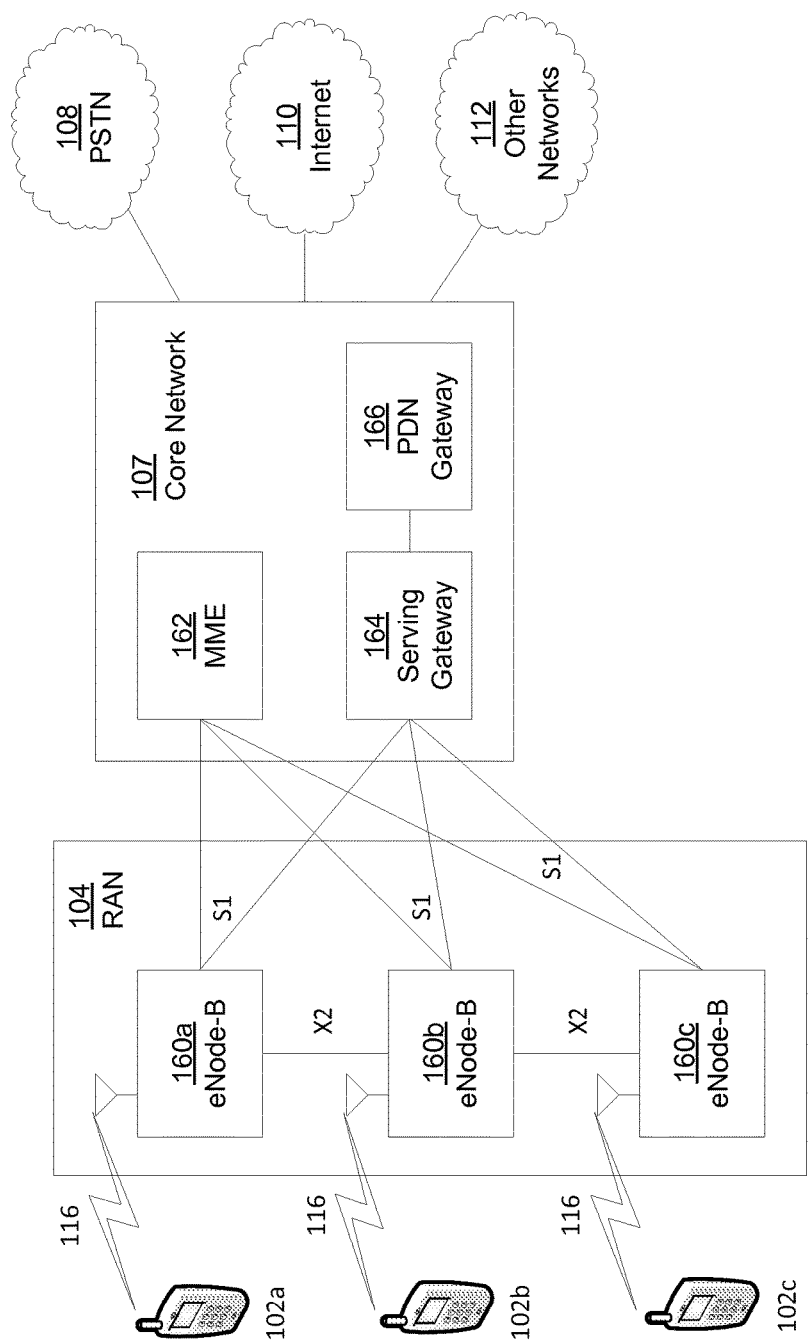
FIG. 10D depicts a system diagram of an example radio access network and an example core network that may be used within the communications system illustrated in FIG. 10A.

FIG. 10D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 10D, the eNode-Bs 160a, 160b, 160c may communicate with one another over an X2 interface.

The core network 107 shown in FIG. 10D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 10E:
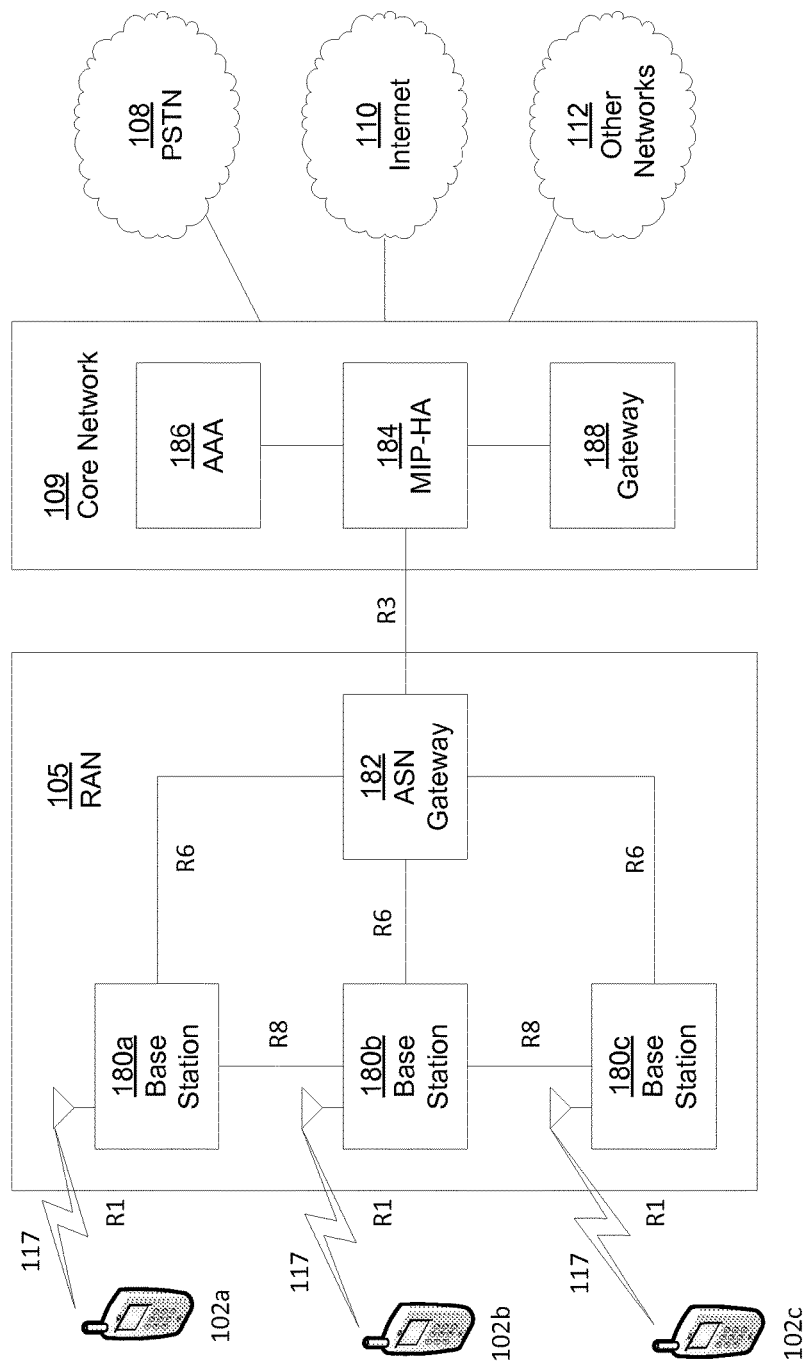
FIG. 10E depicts a system diagram of an example radio access network and an example core network that may be used within the communications system illustrated in FIG. 10A.

FIG. 10E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 10E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 10E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 10E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) for video encoding comprising:
 a processor configured to:
  identify an enhancement layer having at least two reference layers associated with a multi-layer video;
  determine which reference layer of the at least two reference layers of the enhancement layer has a highest priority based on their respective layer priorities signaled at a sequence level;
  determine whether a region of an enhancement layer picture of the enhancement layer is to be skipped and predicted using a reference region of an inter-layer reference picture associated with the enhancement layer picture; and encode the enhancement layer picture based on the determination, wherein on a condition that the reference region of the associated inter-layer reference picture is to be used to predict the region of the enhancement layer, the region of the enhancement layer picture is skipped during encoding, and a syntax element is included in a bit stream indicating that the region is to be skipped and that the reference region of the associated inter-layer reference picture from the determined reference layer that has the highest priority is to be used to predict the region.

2. The WTRU of claim 1, wherein the syntax element comprises a binary flag that indicates whether the region is skipped.

3. The WTRU of claim 1, wherein the inter-layer reference picture is a reconstructed picture of the reference layer of the at least two reference layers that has the highest priority, the reconstructed picture being co-located with an enhancement layer picture.

4. The WTRU of claim 1, wherein the reference region comprises a region of the inter-layer reference picture that is co-located with the region.

5. The WTRU of claim 1, wherein the processor is further configured to encode the syntax element into a header of a region in the bit stream.

6. The WTRU of claim 1, wherein the processor is further configured to encode the syntax element into a parameter set associated with a region in the bit stream.

7. The WTRU of claim 6, wherein the parameter set comprises an adaptation parameter set.

8. The WTRU of claim 1, wherein the processor is further configured to predict the region using an upsampled portion of the inter-layer reference picture.

9. The WTRU of claim 1, wherein the skipped region comprises a slice.

10. A wireless transmit/receive unit (WTRU) for video decoding comprising:
a processor configured to:
recover a syntax element associated with an enhancement layer of a scalable bit stream, the syntax element indicating whether a region of an enhancement layer picture of the enhancement layer was skipped during encoding, wherein the enhancement layer comprises at least two reference layers;
upon recovering the syntax element indicating that the region of the enhancement layer picture was skipped during encoding, determine the reference layer of the at least two reference layers of the enhancement layer that has the highest priority based on layer priorities signaled at a sequence level;
select an inter-layer reference picture associated with the enhancement layer picture from the determined the reference layer;
identify a reference region of the inter-layer reference picture; and
decode the enhancement layer picture by predicting the region of the enhancement layer picture using the identified reference region of the inter-layer reference picture.

11. The WTRU of claim 10, wherein the highest layer of the at least two reference layers is the reference layer that has the highest priority.

12. The WTRU of claim 10, wherein the syntax element comprises a binary flag that indicates whether the region is skipped.

13. The WTRU of claim 10, wherein the processor is configured to recover the syntax element from at least one of a header of a region in the scalable bit stream or a parameter set associated with the region in the scalable bit stream.

14. The WTRU of claim 10, wherein the inter-layer reference picture comprises a picture of the reference layer that has the highest priority that is co-located with an enhancement layer picture.

15. The WTRU of claim 10, wherein the reference region comprises a region of the inter-layer reference picture that is co-located with the region.

16. The WTRU of claim 10, wherein the processor is further configured to predict the region based on an upsampled portion of the inter-layer reference picture.

17. The WTRU of claim 10, wherein the skipped region comprises a slice.

18. A method for video encoding comprising:
identifying an enhancement layer having at least two reference layers associated with a multi-layer video;
determining which reference layer of the at least two reference layers of the enhancement layer has a highest priority using layer priorities signaled at a sequence level;
determining whether a region of an enhancement layer picture of the enhancement layer is to be skipped and predicted using a reference region of an inter-layer reference picture associated with the enhancement layer picture; and
encoding the enhancement layer picture based on the determination, wherein on a condition that the reference region of the associated inter-layer reference picture is to be used to predict the region of the enhancement layer, the region of the enhancement layer picture is skipped during encoding, and a syntax element is included in a bit stream indicating that the region is to be skipped and that the reference region of the associated inter-layer reference picture from the determined reference layer that has the highest priority is to be used to predict the region.

19. The method of claim 18, wherein the syntax element comprises a binary flag that indicates whether the region is skipped.

20. The method of claim 18, wherein the inter-layer reference picture is a reconstructed picture of the reference layer of the at least two reference layers that has the highest priority, the reconstructed picture being co-located with an enhancement layer picture and the reference region comprising a region of the inter-layer reference picture that is co-located with the region.

21. The method of claim 18, wherein the syntax element is encoded into a header associated with a region in the bit stream.

22. The method of claim 18, wherein the syntax element is encoded into a parameter set associated with a region of the bit stream.

23. The method of claim 18, further comprising predicting the skipped region based on an upsampled portion of the inter-layer reference picture.

24. The method of claim 18, wherein the skipped region comprises a slice.

* * * * *